(12) United States Patent
Tsuchino et al.

(10) Patent No.: US 10,438,627 B2
(45) Date of Patent: Oct. 8, 2019

(54) INFORMATION RECORDING MEDIUM AND METHOD FOR MANUFACTURING INFORMATION RECORDING MEDIUM

(71) Applicant: Panasonic Intellectual Property Management Co., Ltd., Osaka (JP)

(72) Inventors: Akio Tsuchino, Okayama (JP); Rie Kojima, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 96 days.

(21) Appl. No.: 15/656,166

(22) Filed: Jul. 21, 2017

(65) Prior Publication Data
US 2017/0323660 A1    Nov. 9, 2017

Related U.S. Application Data

(63) Continuation of application No. PCT/JP2016/000511, filed on Feb. 2, 2016.

(30) Foreign Application Priority Data

Feb. 10, 2015    (JP) .................................. 2015-024535

(51) Int. Cl.
*G11B 7/24*      (2013.01)
*G11B 7/2437*    (2013.01)
(Continued)

(52) U.S. Cl.
CPC ............ *G11B 7/2437* (2013.01); *G11B 7/241* (2013.01); *G11B 7/243* (2013.01);
(Continued)

(58) Field of Classification Search
CPC ......... G11B 7/243; G11B 7/252; G11B 7/266; G11B 7/2437; G11B 7/24038; G11B 7/25715
See application file for complete search history.

(56) References Cited

U.S. PATENT DOCUMENTS

2002/0122366 A1    9/2002    Kitaura et al.
2005/0237894 A1    10/2005   Mishima et al.
(Continued)

FOREIGN PATENT DOCUMENTS

JP    2000-163804    6/2000
JP    3752177        3/2006
(Continued)

OTHER PUBLICATIONS

International Search Report dated Apr. 26, 2016 in International (PCT) Application No. PCT/JP2016/000511.

*Primary Examiner* — Elizabeth E Mulvaney
(74) *Attorney, Agent, or Firm* — Wenderoth, Lind & Ponack, L.L.P.

(57) ABSTRACT

An information recording medium according to the present disclosure is an information recording medium of a write-once-read-many type and records or reproduces information when irradiated with laser light. The information recording medium includes: a substrate; a plurality of information layers at least one information layer of which includes a recording film that is a W—O-based recording film comprising at least tungsten (W) and oxygen (O); and a dielectric film A in contact with the W—O-based recording film, the dielectric film A comprising at least 30 mol % tin oxide.

10 Claims, 2 Drawing Sheets

(51) Int. Cl.
  *G11B 7/24038* (2013.01)
  *G11B 7/241* (2006.01)
  *G11B 7/243* (2013.01)
  *G11B 7/26* (2006.01)
  *G11B 7/257* (2013.01)

(52) U.S. Cl.
  CPC .......... *G11B 7/24038* (2013.01); *G11B 7/257* (2013.01); *G11B 7/26* (2013.01); *G11B 7/266* (2013.01); *G11B 2007/2432* (2013.01); *G11B 2007/24304* (2013.01); *G11B 2007/24306* (2013.01); *G11B 2007/2571* (2013.01); *G11B 2007/25715* (2013.01)

(56) References Cited

U.S. PATENT DOCUMENTS

| | | |
|---|---|---|
| 2005/0244753 A1 | 11/2005 | Mishima et al. |
| 2008/0279080 A1 | 11/2008 | Tabata et al. |
| 2009/0269539 A1 | 10/2009 | Doi et al. |
| 2012/0015133 A1 | 1/2012 | Tabata |
| 2012/0201991 A1 | 8/2012 | Tabata |
| 2013/0095348 A1 | 4/2013 | Tabata |
| 2013/0294216 A1 | 11/2013 | Okawa |
| 2015/0132606 A1 | 5/2015 | Kurokawa et al. |

FOREIGN PATENT DOCUMENTS

| | | |
|---|---|---|
| JP | 3802040 | 7/2006 |
| JP | 2008-305529 | 12/2008 |
| JP | 2012-022758 | 2/2012 |
| JP | 2012-161941 | 8/2012 |
| JP | 2012-164375 | 8/2012 |
| JP | 2013-86336 | 5/2013 |
| JP | 2013-232252 | 11/2013 |
| WO | 2006/109534 | 10/2006 |
| WO | 2013/183277 | 12/2013 |
| WO | 2013/190626 | 12/2013 |

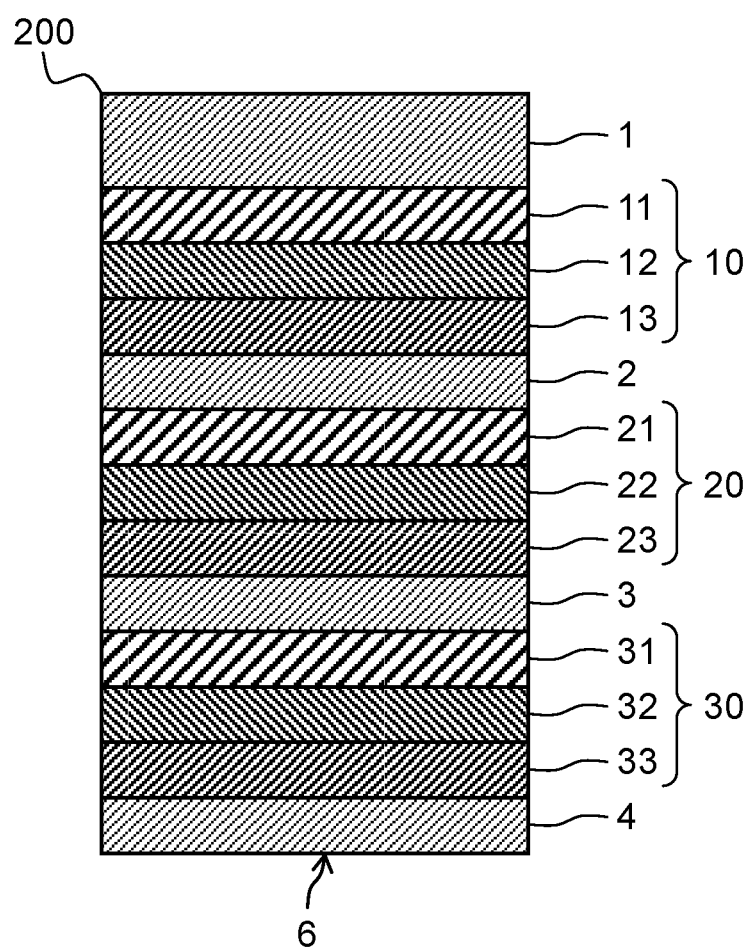

INFORMATION RECORDING MEDIUM AND METHOD FOR MANUFACTURING INFORMATION RECORDING MEDIUM

BACKGROUND

1. Technical Field

The present disclosure relates to a high-density information recording medium which records or reproduces information by an optical means, and a method for manufacturing the information recording medium.

2. Description of the Related Art

Compact discs (CDs), digital versatile discs (DVDs), and Blu-ray discs (registered trademark) (BDs) are examples of optical information recording mediums commercialized thus far.

As one type of the BDs. 100-GB mediums conforming to the BD-XL standard have been commercialized. With the mediums conforming to the BD-XL standard, three information layers are provided and the recording density per information layer is 33.4 GB, thereby achieving a high density of 100 GB. In recent years, a proposal has been made to make the capacity at least 300 GB per medium by further increasing the linear density and employing land/groove recording.

One feature of the optical information recording medium is the excellent long-term storage stability. Therefore, the above-described mediums having a large capacity are optimal mediums for data archiving whereby a large amount of important data such as archives, medical images, and video are stored for a long period of time. As the mediums used for such data archiving, write-once-read-many information recording mediums are suitable. Various recording film materials are used for the write-once-read-many information recording mediums. Examples include Te—O—Pd which makes use of phase change between crystalline and amorphous states (see Japanese Patent No. 3752177), W—O in which marks (pits) are formed using bubbles (see Japanese Unexamined Patent Application Publication No. 2012-161941), and Ge—Bi—O (see Japanese Patent No. 3802040).

In the above-described write-once-read-many information recording medium, a dielectric film is provided in order to optimize the optical design such as the recording sensitivity and the modulation depth, or to protect the recording film material from the impact of moisture, for example. Examples of the material for the dielectric film include $ZnS—SiO_2$ and an indium tin oxide (ITO).

SUMMARY

An object of the present disclosure is to provide an optical information recording medium which includes an information layer having a recording film that includes tungsten (W) and oxygen (O), and whose recording characteristics after long-term storage (shelf characteristics) are improved.

An information recording medium according to the present disclosure is an information recording medium which is of a write-once-read-many type and records or reproduces information when irradiated with laser light, the information recording medium including: a substrate; a plurality of information layers at least one information layer of which includes a recording film that is a W—O-based recording film including at least tungsten (W) and oxygen (O); and a dielectric film A in contact with the W—O-based recording film, the dielectric film A including at least 30 mol % tin oxide.

A method for manufacturing an information recording medium according to the present disclosure is a method including two or more steps of forming an information layer, wherein at least one of the two or more steps of forming the information layer includes: (i) forming a W—O-based recording film including tungsten (W) and oxygen (O); and (ii) forming a dielectric film A including at least 30 mol % tin oxide, the forming of the W—O-based recording film (i) includes sputtering, using a target including W and O, and the forming of the dielectric film A (ii) includes sputtering, using a target including Sn and O.

The information recording medium in the present disclosure exhibits favorable signal properties, favorable signal storage stability, and favorable shelf characteristics. Furthermore, according to the method for manufacturing an information recording medium in the present disclosure, it is possible to manufacture an information recording medium that exhibits favorable signal properties, favorable signal storage stability, and favorable shelf characteristics.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a cross sectional view of an information recording medium according to Embodiment 2 of the present disclosure.

DETAILED DESCRIPTION OF EMBODIMENTS

Background to the Present Disclosure

Figure 1:
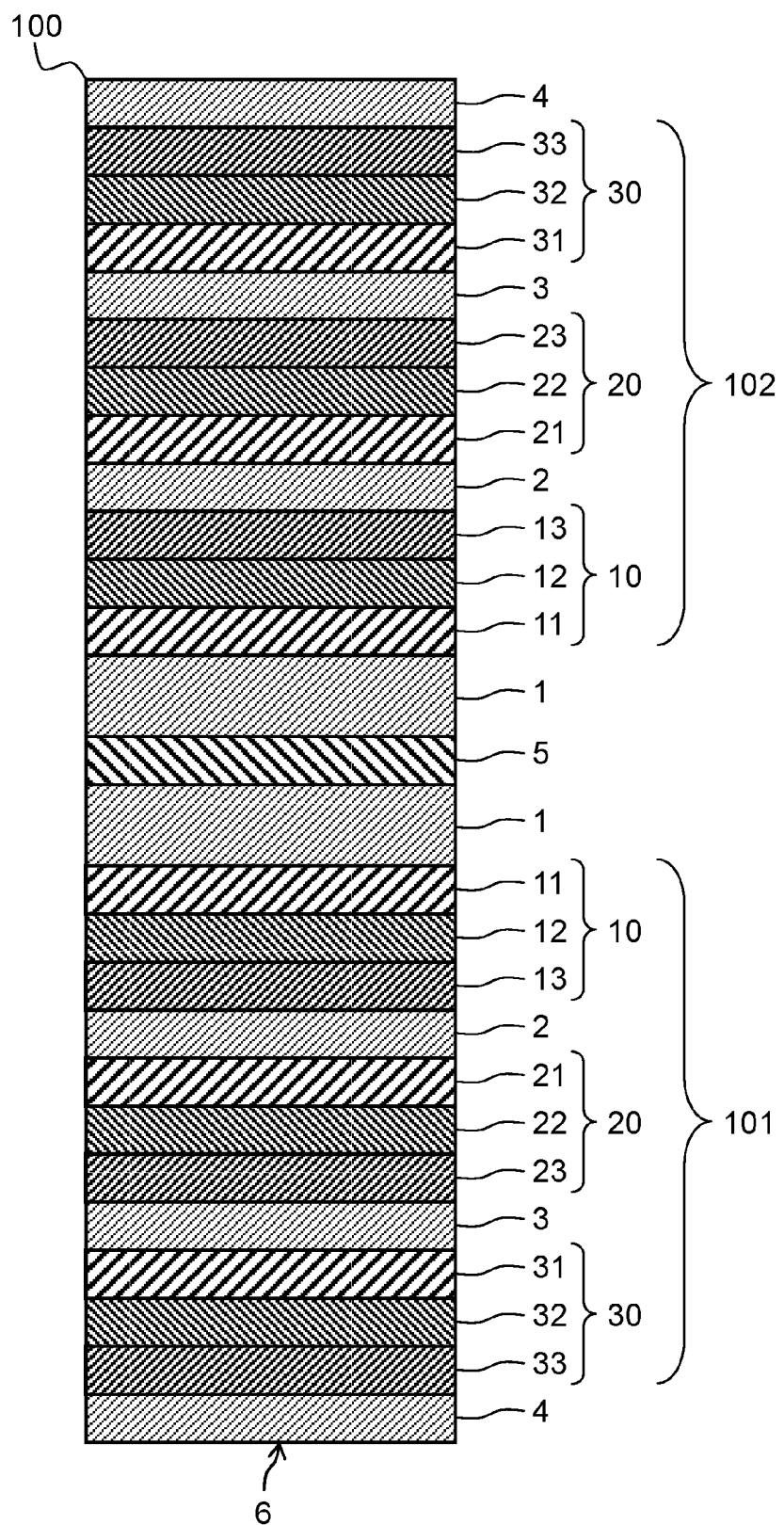
FIG. 1 is a cross sectional view of an information recording medium according to Embodiment 1 of the present disclosure.

The inventors have found a problem with an information recording medium including a recording film that includes tungsten (W) and oxygen (O), in terms of the recording characteristics after long-term storage (shelf characteristics). When heat is applied to raise the temperature to a certain level or higher by irradiating the recording film including W and O with laser light, for example, oxygen in the film is separated and bonded, forming bubbles that become marks (pits). Since the portion of the recording film in which bubbles are formed changes optically and expands in volume, it is possible to bring about an extremely large modulation depth as signal properties. Furthermore, since the bubble formation is an irreversible change, pits have excellent long-term storage stability.

On the other hand, when the information recording medium provided with pits is stored for a long period of time, the bonding state of each element in unrecorded portions of the recording film gradually changes, and the optical properties and/or the physical hardness may thereby change. Therefore, the characteristics of the information recording medium may be degraded compared to its initial characteristics at the time the information recording medium is produced. Specifically, in terms of the recording and reproduction performance of the information recording medium, the recording sensitivity and/or integrated-maximum likelihood sequence estimation (i-MLSE) of the shelf characteristics may degrade.

The degree of degradation of the shelf characteristics tends to increase with the content of W in the recording film. In the information recording medium including a plurality of information layers, an information layer closer to the laser irradiation side needs to have a high transmittance in order to allow the laser light to pass through even an information layer farther from the laser irradiation side, so as to ensure high-sensitivity recording and reproduction in the information layer farther from the laser irradiation side. With the recording film material including W and O, it is necessary to increase the content of W in order to achieve a high transmittance. As a result, the closer the information layer is to the laser irradiation side, the greater the degradation of the shelf characteristics of the information layer is.

The inventors have devised a dielectric material that less easily causes a structural change of the recording film including W and O even in the case of long-term storage or promotes bubble formation at the time of recording. The inventors have found, in particular, that it is possible to achieve favorable shelf characteristics when a dielectric film including a dielectric material including at least 30 mol % tin oxide is provided in contact with the recording film including W and O.

That is to say, a first aspect of the present disclosure is an information recording medium which is of a write-once-read-many type and records or reproduces information when irradiated with laser light, the information recording medium including: a substrate; a plurality of information layers at least one information layer of which includes a recording film that is a W—O-based recording film including at least tungsten (W) and oxygen (O); and a dielectric film A in contact with the W—O-based recording film, the dielectric film A including at least 30 mol % tin oxide.

A second aspect of the present disclosure is the information recording medium according to the first aspect, wherein the tin oxide is $SnO_2$. When the tin oxide is $SnO_2$, at least one information layer tends to have a higher transmittance and more favorable shelf characteristics.

A third aspect of the present disclosure is the information recording medium according to the first aspect or the second aspect, wherein the dielectric film A further includes an oxide of an element M0, where M0 is at least one element selected from among Si, Ge, Al, Ga, In, Zn, Sb, Bi, Cr, V, Nb, Ta, Ti, Zr, Hf, and Y. By including these elements, at least one information layer tends to have a higher transmittance or higher recording sensitivity.

A fourth aspect of the present disclosure is the information recording medium according to any one of the first to the third aspects, wherein the W—O-based recording film further includes an element M1, where M1 is at least one element selected from among Ge, Al, Zn, Bi, Te, Cu, Ag, Au, Ni, Pd, Pt, Co, Fe, Mn, Ta, Cr, and Mo. In this aspect, the modulation depth tends to be greater.

A fifth aspect of the present disclosure is the information recording medium according to any one of the first to the fourth aspects, wherein the at least one information layer includes the dielectric film A, the W—O-based recording film, and an $In_2O_3$—$SnO_2$ dielectric film in stated order from a side closer to a surface of the information recording medium irradiated with the laser light, the $In_2O_3$—$SnO_2$ dielectric film including less than 30 mol % $SnO_2$. In this aspect, the modulation depth and the recording sensitivity tend to be greater.

A sixth aspect of the present disclosure is the information recording medium according to any one of the first to the fifth aspects, wherein when the plurality of information layers include N information layers including: an Nth information layer closest to a surface of the information recording medium irradiated with the laser light; and a first information layer closest to the substrate, at least the Nth information layer includes the W—O-based recording film and the dielectric film A, where N is a positive integer. The shelf characteristics are likely to degrade in an information layer closer to the laser irradiation side. Therefore, by including at least the Nth information layer as the dielectric film A, the shelf characteristics of the Nth information layer do not significantly degrade as compared to the shelf characteristics of the other information layers, and a medium that exhibits favorable shelf characteristics as a whole can be realized.

A seventh aspect of the present disclosure is the information recording medium according to any one of the first to the sixth aspects, wherein the information recording medium includes at least one of the plurality of information layers on both sides via the substrate. According to this configuration, the capacity of the information recording medium can be increased.

An eighth aspect of the present disclosure is the information recording medium according to any one of the first to the seventh aspects, wherein when: the information recording medium includes a guide groove in each of the plurality of information layers; and grooves of the guide groove are closer than lands of the guide groove that are between the grooves to a surface of the information recording medium irradiated with the laser light, information is recorded at positions, in each of recording films included in the plurality of information layers, that correspond to the grooves and the lands. According to this configuration, the capacity of the information recording medium can be increased.

A ninth aspect of the present disclosure is a method for manufacturing an information recording medium, the method including two or more steps of forming an information layer, wherein at least one of the two or more steps of forming the information layer includes: (i) forming a W—O-based recording film including tungsten (W) and oxygen (O); and (ii) forming a dielectric film A including at least 30 mol % tin oxide, the forming of the W—O-based recording film (i) includes sputtering, using a target including W and O, and the forming of the dielectric film A (ii) includes sputtering, using a target including Sn and O. This aspect makes it possible to obtain the information recording medium according to the first aspect.

A tenth aspect of the present disclosure is the method according to the ninth aspect, wherein a direct current (DC) reactive sputtering method with oxygen added is used in the forming of the W—O-based recording film (i). Since the DC reactive sputtering method with oxygen added is expected to bring about a high film formation rate, this aspect makes it possible to reduce the tact time and the manufacturing cost of the information recording medium.

An eleventh aspect of the present disclosure is the method according to the ninth aspect or the tenth aspect, wherein a direct current (DC) sputtering method is used in the forming of the dielectric film A (ii). In the forming of the dielectric film A in (ii), it is possible to reduce the tact time and the manufacturing cost of the information recording medium by using the DC sputtering method expected to bring about a high film formation rate.

Hereinafter, embodiments will be described in detail with reference to the drawings as necessary. However, unnecessarily detailed descriptions may be omitted. For example, detailed descriptions of well-known aspects or repetitive descriptions of essentially the same configurations may be omitted. This is to avoid unnecessary redundancy and make the following description easier for those skilled in the art to understand.

It should be noted that the accompanying drawings and the following description are provided not to limit the subject matter recited in the claims, but to aid a person skilled in the art to adequately understand the present disclosure.

Embodiment 1

An example of an information recording medium that records and reproduces information using laser light will be described as Embodiment 1. FIG. 1 illustrates a cross section of the optical information recording medium according to Embodiment 1. Information recording medium 100 according to the present embodiment is a multilayered optical information recording medium including a total of six information layers that record and reproduce information, that is, three layers on each side of substrates 1. Information recording medium 100 is capable of recording and reproducing information in each information layer when irradiated with laser light 6 from the side on which cover layer 4 is provided. Laser light 6 is in a blue-violet range near the wavelength of 405 nm.

Information recording medium 100 is a double-sided information recording medium formed by bonding A-side information recording medium 101 referred to as the A side with B-side information recording medium 102 referred to as the B side. Two information recording mediums, namely, A-side information recording medium 101 and B-side information recording medium 102, are bonded via bonding layer 5 at the back surfaces of substrates 1 (the surfaces opposite the surfaces on which the information layers are provided) of A-side information recording medium 101 and B-side information recording medium 102. Each of A-side information recording medium 101 and B-side information recording medium 102 includes first information layer 10, second information layer 20, and third information layer 30 that are sequentially stacked on substrate 1 via intermediate separation layers 2 and 3, for example, and further includes cover layer 4 in contact with third information layer 30. Second information layer 20 and third information layer 30 are light-transmissive information layers.

In the case of forming guide grooves in substrates 1 of information recording medium 100, in this specification, protrusions closer to the side irradiated with laser light 6, that is, protrusions on the front surface side of A-side information recording medium 101 and protrusions on the front surface side of B-side information recording medium 102 are referred to as "grooves" for convenience, whereas recesses farther from the side irradiated with laser light 6, that is, recesses on the front surface side of A-side information recording medium 101 and recesses on the front surface side of B-side information recording medium 102 are referred to as "lands" for convenience. By forming pits at positions, in the recording film, that correspond to the grooves and lands, that is, by performing land-groove recording, the capacity per information layer can be 50 GB, for example. Since information recording medium 100 is capable of recording and reproducing information with six information layers, information recording medium 100 can be provided with a capacity of 300 GB. The guide grooves may be formed in intermediate separation layers 2 and 3 as will be described later. In particular, guide grooves may be formed in intermediate separation layers 2 and 3 for performing land-groove recording in second information layer 20 and third information layer 30.

The effective reflectance of the three information layers can be controlled by adjusting the reflectance of first information layer 10, second information layer 20, and third information layer 30, and the transmittance of second information layer 20 and third information layer 30.

In this specification, the reflectance of each of the three information layers measured in a state of being stacked is defined as the effective reflectance. Unless otherwise specified or unless noted as "effective", the reflectance refers to a reflectance measured without being stacked. Rg denotes the reflectance of the groove portion in an unrecorded state, and Rl denotes the reflectance of the land portion in an unrecorded state.

The present embodiment describes, as an example, a configuration designed such that the effective Rg and the effective Rl of first information layer 10 are 3.5% and 3.7%, respectively, the effective Rg and the effective Rl of second information layer 20 are 5.0% and 5.2%, respectively, and the effective Rg and the effective Rl of third information layer 30 are 6.5% and 6.8%, respectively.

When the transmittance of third information layer 30 is 79% and the transmittance of second information layer 20 is 75%, the above reflectances can be achieved by designing the configuration such that Rg and Rl of first information layer 10 are 10.0% and 10.5%, respectively, Rg and Rl of second information layer 20 are 8.0% and 8.4%, respectively, and Rg and Rl of third information layer 30 are 6.5% and 6.8%, respectively. The transmittances mentioned here indicate the average of the transmittances in the groove portions and the average of the transmittances in the land portions when the recording film is in an unrecorded state.

Next, the function, material, and thickness of substrate 1, intermediate separation layer 2, intermediate separation layer 3, cover layer 4, and bonding layer 5 will be described.

Substrate 1 is a disc-shaped transparent substrate. As a material of substrate 1, a resin such as polycarbonate, amorphous polyolefin, or polymethyl methacrylate (PMMA), or glass can be used, for example. Guide grooves that are recesses and projections for guiding the laser light may be formed as necessary on the front surface of substrate 1 closer to first information layer 10. In Embodiment 1, substrates 1 have, for example, a thickness of about 0.5 mm and a diameter of about 120 mm.

When the guide grooves are formed on substrates 1, the recesses closer to laser light 6 are referred to as "grooves", and the protrusions farther from laser light 6 are referred to as "lands" as described earlier. The difference in level between the groove surface and the land surface is at least 10 nm and at most 30 nm, for example.

In Embodiment 1, a groove-land distance (the distance between the widthwise center of a groove and the widthwise center of a land adjacent to the groove) is about 0.225 µm; however, the present disclosure is not limited to this.

Intermediate separation layers 2 and 3 include a resin such as a photo-curable resin (particularly an ultraviolet-curable resin) or a slow-acting thermosetting resin, or a dielectric, for example. When intermediate separation layers 2 and 3 have low light absorptance with respect to laser light having a wavelength of λ and used for recording and reproduction, laser light 6 can efficiently reach first information layer 10 and second information layer 20.

Intermediate separation layers 2 and 3 are provided in order to differentiate the focus positions of first information layer 10, second information layer 20, and third information layer 30. Therefore, the thickness of intermediate separation layers 2 and 3 may be at least the focal depth Δ determined according to the numerical aperture (NA) of an objective lens and the wavelength λ of the laser light, for example. When the reference for the light intensity at the focal point is assumed to be 80% as in the case of no aberration, ΔZ can be approximated as follows:

$$\Delta Z = \lambda / \{2(NA)^2\}$$

In order to avoid multilayer interference between second information layer 20 and other layers, the thicknesses of intermediate separation layer 2 and intermediate separation layer 3 may be different from each other.

Guide grooves that are recesses and projections may be formed on the laser light incident side of intermediate separation layers 2 and 3, for example. Although the difference in level of the guide grooves provided in intermediate separation layers 2 and 3 and the groove-land distance are as described with regard to the guide grooves provided in substrates 1, and the groove-land distance is about 0.225 μm in Embodiment 1, the present disclosure is not limited this.

Cover layer 4 includes a resin such as a photo-curable resin (particularly an ultraviolet-curable resin) or a slow-acting thermosetting resin, or a dielectric, for example. Cover layer 4 may have low light absorptance with respect to the laser light used. More specifically, cover layer 4 may be formed using a resin such as polycarbonate, amorphous polyolefin, or PMMA, or glass. In the case of using these materials, cover layer 4 may be formed by, for example, bonding a plate-shaped member to second dielectric film 33 in third information layer 30 using a resin such as a photo-curable resin (particularly an ultraviolet-curable resin) or a slow-acting thermosetting resin as an adhesive. For example, the thickness of cover layer 4 may be in a range from 40 μm to 80 μm approximately in which favorable recording and reproduction are possible when NA equals 0.85. In particular, the thickness of cover layer 4 may be in a range from 50 μm to 65 μm approximately.

Bonding layer 5 includes, for example, a resin such as a photo-curable resin (particularly an ultraviolet-curable resin) or a slow-acting thermosetting resin, and bonds A-side information recording medium 101 and B-side information recording medium 102. Bonding layer 5 may be provided with a film that shields laser light 6.

In the case of giving information recording medium 100 a thickness equivalent to the thickness of an information recording medium conforming to the BD standard, the sum of the thicknesses of intermediate separation layers 2 and 3 and cover layer 4 may be set to 100 μm. For example, intermediate separation layer 2 may have a thickness of about 25 μm, intermediate separation layer 3 may have a thickness of about 18 μm, cover layer 4 may have a thickness of about 57 μm, and bonding layer 5 may have a thickness of about 1 μm.

Next, the configuration of first information layer 10 will be described. First information layer 10 is formed by stacking at least first dielectric film 11, recording film 12, and second dielectric film 13 in this order on the front surface of substrate 1.

First dielectric film 11 has a function to increase the light absorptance of recording film 12 by adjusting the optical distance, a function to increase the signal amplitude by increasing the rate of change in the amount of reflected light before and after recording, and a function to increase the signal amplitude by controlling the bulge of the recording pits. First dielectric film 11 also has a function to suppress moisture ingress into recording film 12 and a function to suppress escape of oxygen in the recording film to the outside.

First dielectric film 11 is dielectric film A that includes tin (Sn) and oxygen (O) in the form of a tin oxide, and includes at least 30 mol % tin oxide. The details of dielectric film A will be described later in connection with second dielectric film 23 of second information layer 20.

According to the findings of the inventors, the shelf characteristics of first information layer 10 farthest from the laser light incident surface (the front surface of cover layer 4) tend to be more favorable than the shelf characteristics of second and third information layers 20 and 30. Furthermore, it has also been found that the advantageous effect produced by providing dielectric film A is more prominent when dielectric film A is provided on the side closer to the laser light incident surface.

Accordingly, in Embodiment 1, first dielectric film 11 need not necessarily be dielectric film A; it may include an oxide other than a tin oxide or a different compound. Alternatively, even in the case of including tin or a tin oxide, first dielectric film 11 may include a smaller proportion of tin or a tin oxide than the proportions specified above.

The following compounds can be used as a material of first dielectric film 11, for example: an oxide such as $SiO_2$, ZnO, $SnO_2$, $Cr_2O_3$, $In_2O_3$, $Sb_2O_3$, $Bi_2O_3$, $Ga_2O_3$, $Al_2O_3$, $TiO_2$, $Ta_2O_5$, $Nb_2O_5$, $Y_2O_3$, $ZrO_2$, $HfO_2$, and $Dy_2O_3$, a nitride such as CN, TiN, ZrN, $Si_3N_4$, GeN, AN, Ge—Si—N, and Ge—Cr—N, a carbide such as SiC, a sulfide such as ZnS, and a fluoride such as $LaF_3$, $CeF_3$, and $YF_3$.

First dielectric film 11 may include a mixture of two or more compounds selected from among these compounds.

Specific examples include $In_2O_3$—$SnO_2$ (ITO), ZnO—$SnO_2$, $ZrO_2$—$Y_2O_3$, $ZrO_2$—$SiO_2$—ZnO, $ZrO_2$—$In_2O_3$, $ZrO_2$—$SiO_2$—$In_2O_3$, $ZrO_2$—$SiO_2$—$In_2O_3$—$SnO_2$, $ZrO_2$—$Y_2O_3$—$In_2O_3$, $ZrO_2$—$Cr_2O_3$, $ZrO_2$—$SiO_2$—$Cr_2O_3$, $ZrO_2$—$Ga_2O_3$, $ZrO_2$—$SiO_2$—$Ga_{23}$, $Ga_2O_3$—$Al_2O_3$, $Ga_2O_3$—ZnO—$Al_2O_3$, $SnO_2$—$Sb_2O_3$, $SiO_2$—$TiO_2$, $TiO_2$—$Nb_2O_5$, $ZrO_2$—$SiO_2$—$Al_2O_3$, $In_2O_3$—$Dy_2O_3$, $Bi_2O_3$—$SiO_2$, $Al_2O_3$-AN, $ZrO_2$—$SiO_2$—ZnS, $SiO_2$—ZnS, and $ZrO_2$—$SiO_2$—$LaF_3$. In these exemplary combinations, two or more oxides may form a multiple oxide. When the proportion of a tin oxide in a combination including the tin oxide is at least 30 mol %, the film formed by that combination is dielectric film A.

Among the compounds listed above, those being electrically conductive as a sputtering target enable film formation by DC sputtering, and are expected to bring about a high film formation rate when first dielectric film 11 is to be formed. It is thus possible to lead to cost reduction of the information recording medium.

Compounds which are electrically conductive are $In_2O_3$ and $SnO_2$, for example. The thickness of first dielectric film 11 may be in a range from 5 nm to 50 nm, for example.

The composition of first dielectric film 11 can be analyzed by X-ray microanalyzer (XMA), electron probe microanalyzer (EPMA), or rutherford backscattering spectrometry (RBS), for example.

First dielectric film 11 formed by sputtering inevitably includes, for example, a noble gas (Ar, Kr, Xe), moisture (O—H), an organic compound (C), and the air (N, O) present in the sputtering atmosphere, a component (metal) of a jig placed in the sputtering chamber, and impurities (metal, semi-metal, semiconductor, dielectric) included in the sputtering target. In some cases, these inevitable components are detected by these analysis methods. The inevitable components may account for no more than 10 atom % of all atoms included in first dielectric film 11, represented as 100 atom %.

First dielectric film 11 excluding the inevitable components is only required to satisfy a predetermined composition ratio. The same applies to first dielectric films 21, 31 and second dielectric films 13, 23, 33 that are other dielectric films described later.

Recording film 12 includes W and O, and is, for example, a W—O-based recording film including a material in which bubbles are formed when O is separated and bonded through laser light irradiation. It is preferable to include at least 3 atom % W (10 atom % in the metal element ratio excluding O) and at least 40 atom % O.

Furthermore, recording film 12 may further include element M1 (where M1 is at least one element selected from among Ge, Al, Zn, Bi, Te, Cu, Ag, Au, Ni, Pd, Pt, Co, Fe, Mn, Ta, Cr, and Mo), thereby achieving further favorable signal properties.

Zn can maintain favorable signal properties and improve the transmittance. By adding at least one element selected from Pd and Mn, recording film 12 can efficiently absorb light and bubbles can be easily formed, thereby improving the degree of signal modulation.

In addition, since at least one element selected from Cu and Ag has high electrical conductivity and enables recording film 12 to efficiently absorb light, high stability (sustainability) can be achieved in the case of forming recording film 12 by DC sputtering.

The thickness of recording film 12 may be in a range from 15 nm to 50 nm, for example.

The composition of recording film 12 can be analyzed by an x-ray microanalyzer (XMA), an electron probe microanalyzer (EPMA), or Rutherford backscattering spectrometry (RBS), for example.

Recording film 12 formed by sputtering inevitably includes, for example, a noble gas (Ar, Kr, Xe), moisture (O—H), an organic compound (C), and the air (N, O) present in the sputtering atmosphere, a component (metal) of a jig placed in the sputtering chamber, and impurities (metal, semi-metal, semiconductor, dielectric) included in the sputtering target. In some cases, these inevitable components are detected by analysis such as inductivity coupled plasma (ICP) emission spectral analysis, XMA, and EPMA. The inevitable components may account for no more than 10 atom % of all atoms included in recording film 12, represented as 100 atom %.

Recording film 12 excluding the inevitable components is only required to satisfy a predetermined composition ratio. The same applies to recording films 22 and 32 which will be described later.

Like first dielectric film 11, second dielectric film 13 has a function to increase the light absorptance of recording film 12 by adjusting the optical distance, a function to increase the signal amplitude by increasing the rate of change in the amount of reflected light before and after recording, and a function to increase the signal amplitude by controlling the bulge of the recording pits.

Second dielectric film 13 also has a function to reduce moisture ingress into recording film 12 and a function to reduce escape of oxygen in the recording film to the outside.

Like first dielectric film 11, second dielectric film 13 may be dielectric film A, or may include an oxide other than a tin oxide or a different compound. Alternatively, even in the case of including tin or a tin oxide, second dielectric film 13 may include a smaller proportion of tin or a tin oxide than dielectric film A.

Like first dielectric film 11, since second dielectric film 13 is a part of first information layer 10 having relatively favorable shelf characteristics, second dielectric film 13 need not necessarily be dielectric film A. Since compounds and combinations thereof suitable for forming second dielectric film 13 are as described earlier in connection with first dielectric film 11, the details thereof will not be repeated here.

The thickness of second dielectric film 13 may be in a range from 5 nm to 50 nm, for example.

Specific thicknesses of first dielectric film 11, recording film 12, and second dielectric film 13 can be designed by calculation based on a matrix method. By adjusting the thickness of each film, it is possible to increase the rate of change in the amount of reflected light between an unrecorded state and a recorded state of recording film 12, and/or optimize the signal quality of the reproduction signal by adjusting the phase difference of reflected light between a recorded portion and an unrecorded portion.

Next, the configuration of second information layer 20 will be described. Second information layer 20 is formed by stacking at least first dielectric film 21, recording film 22, and second dielectric film 23 in this order on the front surface of intermediate separation layer 2.

The functions and shape of first dielectric film 21 are the same as those of first dielectric film 11 of first information layer 10 described earlier. First dielectric film 21 can be formed using the same materials as those exemplified in connection with first dielectric film 11.

Since second information layer 20 is closer to the surface at which laser light 6 is incident than first information layer 10 is, the shelf characteristics of second information layer 20 tend to degrade more than the shelf characteristics of first information layer 10. Therefore, by using dielectric film A as first dielectric film 21, it is possible to further improve the shelf characteristics of second information layer 20.

However, because the shelf characteristics of second information layer 20 are more susceptible to second dielectric film 23 than to first dielectric film 21, first dielectric film 21 need not necessarily be dielectric film A if second dielectric film 23 is dielectric film A as will be described later.

The functions and shape of recording film 22 are the same as those of recording film 12 of first information layer 10 described earlier. Recording film 22 can be formed using the same materials as those exemplified in connection with recording film 12.

Second information layer 20 needs to transmit the laser light for recording and reproducing information in first information layer 10. Thus, the transmittance with respect to the laser light may be enhanced by increasing the content of W in recording film 22 such that the content of W in recording film 22 is greater than the content of W in recording film 12. Specifically, the content of W in recording film 22 may be at least 6 atom % (20 atom % in the metal element ratio excluding O).

Second dielectric film 23 may be dielectric film A. As described earlier, the shelf characteristics of the information layer tend to degrade when the content of W in the recording film is large. Furthermore, the shelf characteristics are more susceptible to, among the two dielectric films provided in contact with the recording film, the dielectric film closer to the laser light incident surface. Therefore, by using dielectric film A including a high proportion of tin or a tin oxide as second dielectric film 23, it is possible to more effectively suppress degradation of the shelf characteristics of second information layer 20.

Dielectric film A includes at least 30 mol % tin oxide. Dielectric film A may include at least 50 mol % tin oxide to achieve more favorable shelf characteristics. The tin oxide may be any of SnO, $SnO_2$, and $Sn_3O_4$. In particular, $SnO_2$ is stable and highly transmissive with respect to laser light.

When second dielectric film 23 is dielectric film A, second dielectric film 23 may include element M0 (where M0 is at least one element selected from among Si, Ge, Al, Ga, In, Zn, Sb, Bi, Cr, V, Nb, Ta, Ti, Zr, Hf, and Y) to improve the transmittance and the recording sensitivity. Element M0 may be included in the form of an oxide.

Second dielectric film 23 can be formed at a high film formation rate by DC sputtering when the sputtering target is electrically conductive. In order to increase the electrical conductivity of the sputtering target, the sputtering target (eventually, dielectric film A formed using the target) may include, in addition to a tin oxide, one or more oxides selected from among $In_2O_3$, ZnO, and $Nb_2O_5$.

In addition, in order to further increase the transmittance of the information layer, element M0 may be included in second dielectric film 23 in the form of one or more oxides selected from among $SiO_2$, $Al_2O_3$, $TiO_2$, and $ZrO_2$.

The proportion of the oxide(s) of element M0 in the dielectric film is not particularly limited as long as the proportion of the tin oxide falls within the above-mentioned range. The proportion of the oxide(s) of element M0 may be in a range from 20 mol % to 70 mol %, for example. For instance, when using one or more oxides selected from among $In_2O_3$, ZnO, and $Nb_2O_5$ to increase the electrical conductivity of the sputtering target, further favorable electrical conductivity can be achieved by setting the proportion of such an oxide(s) in a range from 20 mol % to 70 mol %, for example.

Furthermore, for instance, when using one or more oxides selected from among $SiO_2$, $Al_2O_3$, $TiO_2$, and $ZrO_2$, the transmittance of the information layer can be further increased by setting the proportion of such an oxide(s) in a range from 20 mol % to 70 mol %, for example.

When second dielectric film 23 is dielectric film A, specific examples of a combination of oxides forming dielectric film A include $SnO_2$—$SiO_2$, $SnO_2$—$GeO_2$, $SnO_2$—$Al_2O_3$, $SnO_2$—$Ga_2O_3$, $SnO_2$—$In_2O_3$, $SnO_2$—ZnO, $SnO_2$—$Sb_2O_3$, $SnO_2$—$Bi_2O_3$, $SnO_2$—$Cr_2O_3$, $SnO_2$—$V_2O_5$, $SnO_2$—$Nb_2O_5$, $SnO_2$—$Ta_2O_5$, $SnO_2$—$TiO_2$, $SnO_2$—$ZrO_2$, $SnO_2$—$HfO_2$, $SnO_2$—$Y_2O_3$, $SnO_2$—$In_2O_3$—$SiO_2$, $SnO_2$—$In_2O_3$—$GeO_2$, $SnO_2$—$In_2O_3$—$Al_2O_3$, $SnO_2$—$In_2O_3$—$Ga_2O_3$, $SnO_2$—$In_2O_3$—ZnO, $SnO_2$—$In_2O_3$—$Sb_2O_3$, $SnO_2$—$In_2O_3$—$Bi_2O_3$, $SnO_2$—$In_2O_3$—$Cr_2O_3$, $SnO_2$—$In_2O_3$—$V_2O_5$, $SnO_2$—$In_2O_3$—$Nb_2O_5$, $SnO_2$—$In_2O_3$—$Ta_2O_5$, $SnO_2$—$In_2O_3$—$TiO_2$, $SnO_2$—$In_2O_3$—$ZrO_2$, $SnO_2$—$In_2O_3$—$HfO_2$, $SnO_2$—$In_2O_3$—$Y_2O_3$, $SnO_2$—$SiO_2$—$GeO_2$, $SnO_2$—$SiO_2$—$Al_2O_3$, $SnO_2$—$SiO_2$—$Ga_2O_3$, $SnO_2$—$SiO_2$—ZnO, $SnO_2$—$SiO_2$—$Sb_2O_3$, $SnO_2$—$SiO_2$—$Bi_2O_3$, $SnO_2$—$SiO_2$—$Cr_2O_3$, $SnO_2$—$SiO_2$—$V_2O_5$, $SnO_2$—$SiO_2$—$Nb_2O_5$, $SnO_2$—$SiO_2$—$Ta_2O_5$, $SnO_2$—$SiO_2$—$TiO_2$, $SnO_2$—$SiO_2$—$ZrO_2$, $SnO_2$—$SiO_2$—$HfO_2$, $SnO_2$—$SiO_2$—$Y_2O_3$, $SnO_2$—$Al_2O_3$—$GeO_2$, $SnO_2$—$Al_2O_3$—$Ga_2O_3$, $SnO_2$—$Al_2O_3$—ZnO, $SnO_2$—$Al_2O_3$—$Sb_2O_3$, $SnO_2$—$Al_2O_3$—$Bi_2O_3$, $SnO_2$—$Al_2O_3$—$Cr_2O_3$, $SnO_2$—$Al_2O_3$—$V_2O_5$, $SnO_2$—$Al_2O_3$—$Nb_2O_5$, $SnO_2$—$Al_2O_3$—$Ta_2O_5$, $SnO_2$—$Al_2O_3$—$TiO_2$, $SnO_2$—$Al_2O_3$—$ZrO_2$, $SnO_2$—$Al_2O_3$—$HfO_2$, $SnO_2$—$Al_2O_3$—$Y_2O_3$, $SnO_2$—ZnO—$GeO_2$, $SnO_2$—ZnO—$Ga_2O_3$, $SnO_2$—ZnO—$Sb_2O_3$, $SnO_2$—ZnO—$Bi_2O_3$, $SnO_2$—ZnO—$Cr_2O_3$, $SnO_2$—ZnO—$V_2O_5$, $SnO_2$—ZnO—$Nb_2O_5$, $SnO_2$—ZnO—$Ta_2O_5$, $SnO_2$—ZnO—$TiO_2$, $SnO_2$—ZnO—$ZrO_2$, $SnO_2$—ZnO—$HfO_2$, $SnO_2$—ZnO—$Y_2O_3$, $SnO_2$—$In_2O_3$—$SiO_2$—$GeO_2$, $SnO_2$—$In_2O_3$—$SiO_2$—$Al_2O_3$, $SnO_2$—$In_2O_3$—$SiO_2$—$Ga_2O_3$, $SnO_2$—$In_2O_3$—$SiO_2$—ZnO, $SnO_2$—$In_2O_3$—$SiO_2$—$Sb_2O_3$, $SnO_2$—$In_2O_3$—$SiO_2$—$Bi_2O_3$, $SnO_2$—$In_2O_3$—$SiO_2$—$Cr_2O_3$, $SnO_2$—$In_2O_3$—$SiO_2$—$V_2O_5$, $SnO_2$—$In_2O_3$—$SiO_2$—$Ta_2O_5$, $SnO_2$—$In_2O_3$—$SiO_2$—$TiO_2$, $SnO_2$—$In_2O_3$—$SiO_2$—$ZrO_2$, $SnO_2$—$In_2O_3$—$SiO_2$—$HfO_2$, $SnO_2$—$In_2O_3$—$SiO_2$—$Y_2O_3$, $SnO_2$—$SiO_2$—$ZrO_2$—$GeO_2$, $SnO_2$—$SiO_2$—$ZrO_2$—$Al_2O_3$, $SnO_2$—$SiO_2$—$ZrO_2$—$Ga_2O_3$, $SnO_2$—$SiO_2$—$ZrO_2$—ZnO, $SnO_2$—$SiO_2$—$ZrO_2$—$Sb_2O_3$, $SnO_2$—$SiO_2$—$ZrO_2$—$Bi_2O_3$, $SnO_2$—$SiO_2$—$ZrO_2$—$Cr_2O_3$, $SnO_2$—$SiO_2$—$ZrO_2$—$V_2O_5$, $SnO_2$—$SiO_2$—$ZrO_2$—$Nb_2O_5$, $SnO_2$—$SiO_2$—$ZrO_2$—$Ta_2O_5$, $SnO_2$—$SiO_2$—$ZrO_2$—$TiO_{02}$, $SnO_2$—$SiO_2$—$ZrO_2$—$HfO_2$, $SnO_2$—$SiO_2$—$ZrO_2$—$Y_2O_3$, $SnO_2$—$In_2O_3$—$SiO_2$—$ZrO_2$—$GeO_2$, $SnO_2$—$In_2O_3$—$SiO_2$—$ZrO_2$—$Al_2O_3$, $SnO_2$—$In_2O_3$—$SiO_2$—$ZrO_2$—$Ga_2O_3$, $SnO_2$—$In_2O_3$—$SiO_2$—$ZrO_2$—ZnO, $SnO_2$—$In_2O_3$—$SiO_2$—$ZrO_2$—$Sb_2O_3$, $SnO_2$—$In_2O_3$—$SiO_2$—$ZrO_2$—$Bi_2O_3$, $SnO_2$—$In_2O_3$—$SiO_2$—$ZrO_2$—$Cr_2O_3$, $SnO_2$—$In_2O_3$—$SiO_2$—$ZrO_2$—$V_2O_5$, $SnO_2$—$In_2O_3$—$SiO_2$—$ZrO_2$—$Nb_2O_5$, $SnO_2$—$In_2O_3$—$SiO_2$—$ZrO_2$—$Ta_2O_5$, $SnO_2$—$In_2O_3$—$SiO_2$—$ZrO_2$—$TiO_2$, $SnO_2$—$In_2O_3$—$SiO_2$—$ZrO_2$—$HfO_2$, $SnO_2$—$In_2O_3$—$SiO_2$—$Zr_2$—$Y_2O_3$, $SnO_2$—$In_2O_3$—$SiO_2$—ZnO—$GeO_2$, $SnO_2$—$In_2O_3$—$SiO_2$—ZnO—$Al_2O_3$, $SnO_2$—$In_2O_3$—$SiO_2$—ZnO—$Ga_2O_3$, $SnO_2$—$In_2O_3$—$SiO_2$—ZnO—$Sb_2O_3$, $SnO_2$—$In_2O_3$—$SiO_2$—ZnO—$Bi_2O_3$, $Sn_2$—$In_2O_3$—$SiO_2$—ZnO—$Cr_2O_3$, $SnO_2$—$In_2O_3$—$SiO_2$—ZnO—$V_2O_5$, $SnO_2$—$In_2O_3$—$SiO_2$—ZnO—$Nb_2O_5$, $SnO_2$—$In_2O_3$—$SiO_2$—ZnO—$Ta_2O_5$, $SnO_2$—$In_2O_3$—$SiO_2$—ZnO—$TiO_2$, $SnO_2$—$In_2O_3$—$SiO_2$—ZnO—$HfO_2$, $SnO_2$—$In_2O_3$—$SiO_2$—ZnO—$Y_2O_3$, $SnO_2$—$In_2O_3$—$SiO_2$—$ZrO_2$—ZnO—$GeO_2$, $SnO_2$—$In_2O_3$—$SiO_2$—$ZrO_2$—ZnO—$Al_2O_3$, $SnO_2$—$In_2O_3$—$SiO_2$—$ZrO_2$—ZnO—$Ga_2O_3$, $SnO_2$—$In_2O_3$—$SiO_2$—$ZrO_2$—ZnO—$Sb_2O_3$, $SnO_2$—$In_2O_3$—$SiO_2$—$ZrO_2$—ZnO—$Bi_2O_3$, $SnO_2$—$In_2O_3$—$SiO_2$—$ZrO_2$—ZnO—$Cr_2O_3$, $SnO_2$—$In_2O_3$—$SiO_2$—$ZrO_2$—ZnO—$V_2O_5$, $SnO_2$—$In_2O_3$—$SiO_2$—$ZrO_2$—ZnO—$Nb_2O_5$, $SnO_2$—$In_2O_3$—$SiO_2$—$ZrO_2$—ZnO—$Ta_2O_5$, $SnO_2$—$In_2O_3$—$SiO_2$—$ZrO_2$—ZnO—$TiO_2$, $SnO_2$—$In_2O_3$—$SiO_2$—$ZrO_2$—ZnO—$HfO_2$, $SnO_2$—$In_2O_3$—$SiO_2$—$ZrO_2$—ZnO—$Y_2O_3$, $SnO_2$—$Al_2TiO_5$, $SnO_2$—$ZnAl_2O_4$, $SnO_2$—$ZnCr_2O_4$, $SnO_2$—$Zn_2SiO_4$, $SnO_2$—$Bi_2Sn_2O_7$, $SnO_2$—$Bi_4Ti_3O_{12}$, $SnO_2$—$ZrSiO_4$, $SnO_2$—$Y_3Al_5O_{12}$, $SnO_2$—$In_2O_3$—$Al_2TiO_5$, $SnO_2$—$In_2O_3$—$ZnAl_2O_4$, $SnO_2$—$In_2O_3$—$ZnCr_2O_4$, $SnO_2$—$In_2O_3$—$Zn_2SiO_4$, $SnO_2$—$In_2O_3$—$Bi_2Sn_2O_7$, $SnO_2$—$In_2O_3$—$Bi_1Ti_{3O12}$, $SnO_2$—$In_2O_3$—$ZrSiO_4$, $SnO_2$—$In_2O_3$—$Y_3Al_5O_{12}$, $SnO_2$—$Si_2$-$A_2TiO_5$, $SnO_2$—$SiO_2$—$ZnAl_2O_4$, $SnO_2$—$SiO_2$—$ZnCr_2O_4$, $SnO_2$—$SiO_2$—$Bi_2Sn_2O_7$, $SnO_2$—$SiO_2$—$Bi_4Ti_3O_{12}$, $SnO_2$—$SiO_2$—$Y_3Al_5O_{12}$, $SnO_2$—ZnO—$Al_2TiO_5$, $SnO_2$—ZnO—$Bi_2Sn_2O_7$, $SnO_2$—ZnO—$Bi_4Ti_3O_{12}$, $SnO_2$—ZnO—$ZrSiO_4$, $SnO_2$—ZnO—$Y_3Al_5O_{12}$, $SnO_2$—$In_2O_3$—$SiO_2$—$Al_2TiO_5$, $SnO_2$—$In_2O_3$—$SiO_2$—$ZnAl_2O_4$, $SnO_2$—$In_2O_3$—$SiO_2$—$ZnCr_2O_4$, $SnO_2$—$In_2O_3$—$SiO_2$—$Bi_2Sn_2O_7$, $SnO_2$—$In_2O_3$—$SiO_2$—$Bi_4Ti_3O_{12}$, $SnO_2$—$In_2O_3$—$SiO_2$-$Y_3Al_5O_{12}$, $SnO_2$—$In_2O_3$—$SiO_2$—$ZrO_2$—$Al_2TiO_5$, $SnO_2$—$In_2O_3$—$SiO_2$—$ZrO_2$—$ZnAl_2O_4$, $SnO_2$—$In_2O_3$—$SiO_2$—$ZrO_2$—$ZnCr_2O_4$, $SnO_2$—$In_2O_3$—$SiO_2$—$ZrO_2$—$Zn_2SiO_4$, $SnO_2$—$In_2O_3$—$SiO_2$—$ZrO_2$—$Bi_2Sn_2O_7$, $SnO_2$—$In_2O_3$—$SiO_2$—$ZrO_2$—$Bi_4Ti_3O_{12}$, $SnO_2$—$In_2O_3$—$SiO_2$—$ZrO_2$—$Y_3Al_5O_{12}$, $SnO_2$—$ZrSiO$—$Al_2TiO_5$, $SnO_2$—$ZrSiO$—$ZnAl_{12}O_4$, $SnO_2$—$ZrSiO_4$—$ZnCr_2O_4$, $SnO_2$—$ZrSiO_4$—$Zn_2SiO_4$, $SnO_2$—$ZrSiO_4$—$Bi_2Sn_2O_7$, $SnO_2$—$ZrSiO_4$—$Bi_4Ti_3O_{12}$, or $SnO_2$—$ZrSiO_4$—$Y_3Al_5O_{12}$. In these exemplary combinations, two or more oxides may form a mixture or a multiple oxide.

Second dielectric film 23 need not necessarily be dielectric film A, and may be formed using one compound selected from among the oxides, carbides, sulfides, and fluorides described in connection with first dielectric film 11 of first information layer 10 or a mixture thereof when another information layer includes dielectric film A in contact with the recording film including W and O.

Since specific examples of compounds and combinations thereof suitable for forming second dielectric film 23 when second dielectric film 23 is not dielectric film A are as described earlier in connection with first dielectric film 11, the details thereof will not be repeated here.

When second dielectric film 23 is dielectric film A, first dielectric film 21 may be $In_2O_3$—$SnO_2$ (ITO) (including less than 30 mol % $SnO_2$; for example, in a range from 15 mol % to 20 mol %). Since ITO includes a high proportion of $In_2O_3$ having high electrical conductivity, second dielectric film 23 can be efficiently formed by DC sputtering.

Next, the configuration of third information layer 30 will be described. Third information layer 30 is formed by stacking at least first dielectric film 31, recording film 32, and second dielectric film 33 in this order on the front surface of intermediate separation layer 3.

The configuration of third information layer 30 is basically the same as second information layer 20.

First dielectric film 31 has the same functions and shape as first dielectric film 21 of second information layer 20. Like first dielectric film 21, first dielectric film 31 can be formed using the same materials as those exemplified in connection with first dielectric film 11 of first information layer 10.

The functions and shape of recording film 32 are the same as those of recording film 22 of second information layer 20. Like recording film 22, recording film 32 can be formed using the same materials as those exemplified in connection with recording film 12 of first information layer 10.

Third information layer 30 needs to transmit the laser light for recording and reproducing information in first information layer 10 and second information layer 20. Thus, the transmittance of recording film 32 with respect to the laser light may be enhanced by increasing the content of W in recording film 32 such that the content of W in recording film 32 is greater than the content of W in recording film 22 of second information layer 20. Specifically, the content of W in recording film 32 may be at least 8 atom % (25 atom % in the metal element ratio excluding O).

Second dielectric film 33 has the same functions and shape as second dielectric film 23 of second information layer 20. Furthermore, second dielectric film 33 can be formed using the same materials as those exemplified in connection with second dielectric film 23 of second information layer 20.

Since third information layer 30 is closest to the surface irradiated with the laser light (the front surface of cover layer 4) and is often designed in a manner that the content of W in recording film 32 is greater than that of the other recording films, the shelf characteristics of third information layer 30 tend to degrade the most among the three information layers. Therefore, in Embodiment 1, at least by using dielectric film A as second dielectric film 33, it is possible to remarkably achieve the effect yielded by dielectric film A (suppression of degradation of the shelf characteristics).

Since the specific configuration of dielectric film A is as described in connection with second dielectric film 33 of second information layer 20, the details thereof will not be repeated here.

When second dielectric film 33 is dielectric film A, first dielectric film 31 may be an $In_2O_3$—$SnO_2$ (ITO) dielectric film (including less than 30 mol % $SnO_2$). As described earlier, the ITO film can be efficiently formed by DC sputtering.

When first dielectric film 31 is dielectric film A, second dielectric film 33 need not be dielectric film A. Alternatively, when another information layer includes dielectric film A in contact with the recording film including W and O, second dielectric film 33 need not be dielectric film A.

When second dielectric film 33 is not dielectric film A, second dielectric film 33 may be formed using one compound selected from among the oxides, carbides, sulfides, and fluorides described in connection with first dielectric film 11 of first information layer 10, or a mixture thereof.

Since specific examples of compounds and combinations thereof suitable for forming second dielectric film 33 when second dielectric film 33 is not dielectric film A are as described earlier in connection with first dielectric film 11, the details thereof will not be repeated here.

In a variation of Embodiment 1, the recording film of any of the information layers in information recording medium 100 described in the present embodiment may be another type of recording film such as Te—O—Pd or Ge—Bi—O, that is, a recording film other than the W—O-based recording film.

Alternatively, in another variation, a dielectric film including a material not exemplified above and a reflective film may be provided as necessary. Advantageous effects produced by the techniques according to the present disclosure are also achieved by these variations.

An information recording medium according to yet another variation may include four or more information layers on each side (the A side and the B side). In that case, advantageous effects of the present embodiment are remarkably achieved when dielectric film A is provided in at least an Nth information layer (N is a positive integer equivalent to the number of information layers).

Advantageous effects of the present embodiment are more remarkably achieved when dielectric film A is provided in at least the Nth information layer and an (N−1)th information layer, irrespective of the number N. Since information layers closer to the laser light are prone to degradation in shelf characteristics, providing dielectric film A in two information layers closer to the laser light makes it easier to reduce the difference in the shelf characteristics between the information layers.

The recording method for information recording medium 100 may be any one of the following: constant linear velocity (CLV) where the linear velocity is constant, constant angular velocity (CAV) where the rotational speed is constant, zoned CLV, and zoned CAV. The available pattern length of a data bit is 79.5 nm.

Recording and reproduction of information on and from information recording medium 100 in the present embodiment may be performed by an optical system in which the numerical aperture NA of the objective lens is 0.85, or an optical system in which NA is >1.

A solid immersion lens (SIL) or a solid immersion mirror (SIM) may be used as the optical system. In this case, intermediate separation layers 2 and 3 and cover layers 4 may each have a thickness of 5 μm at most. Alternatively, an optical system using near-field light may be used.

Next, a method for manufacturing information recording medium 100 described in the present embodiment will be described.

First, a method for manufacturing A-side information recording medium 101 will be described.

First dielectric film 11, recording film 12, and second dielectric film 13 that are included in first information layer 10 can be formed by sputtering method that is one of vapor deposition methods. First, substrate 1 (0.5 mm in thickness, for example) is disposed in a deposition apparatus.

Subsequently, first dielectric film 11 is initially formed. At this time, if substrate 1 has the guide grooves, first dielectric film 11 is formed on the guide groove side. First dielectric film 11 is formed by sputtering in a noble gas atmosphere or a mixed gas atmosphere of a noble gas and a reactant gas such as an oxygen gas or a nitrogen gas, using a sputtering target including a dielectric or a mixed dielectric that forms first dielectric film 11.

While an Ar gas, a Kr gas, and a Xe gas are examples of the noble gas, the Ar gas is advantageous in terms of cost. The same applies to any sputtering performed using, as the atmosphere gas, a noble gas or a mixture gas including a noble gas.

When the sputtering target is electrically conductive, a higher film formation rate can be achieved by using direct current (DC) sputtering or pulsed DC sputtering rather than radio frequency (RF) sputtering.

In the case of forming first dielectric film 11 including a plurality of dielectric materials, multi-sputtering, which is simultaneous deposition of the dielectric materials from a plurality of cathodes, may be performed using the respective sputtering targets for the dielectric materials.

Subsequently, recording film 12 is formed on first dielectric film 11. Recording film 12 can be formed by sputtering in a noble gas atmosphere or a mixed gas atmosphere of a noble gas and a reactant gas, using a sputtering target including a W alloy or a W—O alloy, depending on the composition of recording film 12.

Since the above-mentioned W-alloy target is electrically conductive, a higher film formation rate can be achieved by using DC sputtering or pulsed DC sputtering, rather than RF sputtering. By mixing a large amount of an oxygen gas into the mixed gas atmosphere, more oxygen can be taken into recording film 12.

Recording film 12 may be formed by multi-sputtering, which is simultaneous deposition of the included elements from a plurality of cathodes, using the respective sputtering targets for the elements.

Subsequently, second dielectric film 13 is formed on recording film 12. Second dielectric film 13 can be formed by sputtering in a noble gas atmosphere or a mixed gas atmosphere of a noble gas and a reactant gas, using a sputtering target including a dielectric or a mixed dielectric that forms second dielectric film 13.

In the case of forming second dielectric film 13 using a plurality of dielectric materials, multi-sputtering may be performed.

Subsequently, intermediate separation layer 2 is formed on second dielectric film 13. Intermediate separation layer 2 can be formed in the following manner: apply a resin such as a photo-curable resin (particularly an ultraviolet-curable resin) or a slow-acting thermosetting resin to first information layer 10 and perform spin coating, and then cure the resin.

In the case of providing intermediate separation layer 2 with the guide grooves, intermediate separation layer 2 may be formed in the following manner: perform spin coating while a transfer substrate mold having a surface provided with grooves of a predetermined shape is in close contact with the resin which is not yet cured, cure the resin, and then remove the transfer substrate mold from the cured resin.

Subsequently, second information layer 20 is formed. Specifically, first dielectric film 21 is formed on intermediate separation layer 2. First dielectric film 21 can be formed in the same manner as first dielectric film 11 described earlier.

Subsequently, recording film 22 is formed on first dielectric film 21. Recording film 22 can be formed in the same manner as recording film 12 described earlier.

Subsequently, second dielectric film 23 is formed on recording film 22. Second dielectric film 23 can be formed in the same manner as second dielectric film 13 described earlier.

Subsequently, intermediate separation layer 3 is formed on second dielectric film 23. Intermediate separation layer 3 can be formed in the same manner as intermediate separation layer 2 described earlier.

Subsequently, third information layer 30 is formed. Third information layer 30 can be formed basically in the same manner as second information layer 20 described earlier.

Initially, first dielectric film 31 is formed on intermediate separation layer 3. First dielectric film 31 can be formed in the same manner as first dielectric film 11 described earlier.

Subsequently, recording film 32 is formed on first dielectric film 31. Recording film 32 can be formed in the same manner as recording film 12 described earlier.

Subsequently, second dielectric film 33 is formed on recording film 32. Second dielectric film 33 can be formed in the same manner as second dielectric film 13 described earlier.

Any of the dielectric films and the recording films may be formed with power supply in a range from 100 W to 10 kW and a pressure in the deposition chamber in a range from 0.01 Pa to 10 Pa.

Subsequently, cover layer 4 is formed on second dielectric film 33. Cover layer 4 can be formed in the following manner: apply a resin such as a photo-curable resin (particularly an ultraviolet-curable resin) or a slow-acting thermosetting resin to second dielectric film 33 and perform spin coating, and then cure the resin. Alternatively, cover layer 4 may be formed by bonding a disc-shaped substrate made of a resin such as polycarbonate, amorphous polyolefin, or PMMA, or glass.

Specifically, cover layer 4 can be formed in the following manner: apply a resin such as a photo-curable resin (particularly an ultraviolet-curable resin) or a slow-acting thermosetting resin to second dielectric film 33, perform spin coating to uniformly spread the resin while having the substrate in close contact with the applied resin, and then cure the resin.

Formation time for each film of each information layer may be at most 10 seconds or, in particular, at most 5 seconds per film, so as to increase the mass productivity of the information recording medium and reduce the manufacturing cost.

It should be noted that other than the sputtering method, it is also possible to use a vacuum deposition method, an ion plating method, a chemical vapor deposition (CVD) method, and a molecular beam epitaxy (MBE) method as the method for forming each layer.

A-side information recording medium 101 can be manufactured in the manner described above.

B-side information recording medium 102 can be manufactured in the same manner.

Finally, a photo-curable resin (particularly an ultraviolet-curable resin) is uniformly applied to a surface of substrate 1 of A-side information recording medium 101 opposite the surface provided with the guide grooves, and then a surface of substrate 1 of B-side information recording medium 102 opposite the surface provided with the guide grooves is bonded to the applied resin. After that, the resin is cured by being irradiated with light, so as to form bonding layer 5.

Alternatively, bonding layer 5 may be formed by uniformly applying a slow-acting photo-curable resin to A-side information recording medium 101, irradiating the slow-acting photo-curable resin with light, and then bonding B-side information recording medium 102.

In the manner described above, information recording medium 100 having information layers on both sides according to Embodiment 1 can be manufactured.

Embodiment 2

Another example of the information recording medium according to the present disclosure will be described as Embodiment 2. As Embodiment 2, an example of an information recording medium that records and reproduces information using laser light will be described.

FIG. 2 illustrates a cross section of the optical information recording medium according to Embodiment 2. Information recording medium 200 according to the present embodiment is a multilayered optical information recording medium which includes, on substrate 1, three information layers that record and reproduce information. Information recording medium 200 is capable of recording and reproducing information on and from each information layer when irradiated with laser light 6 from the side on which cover layer 4 is provided. Laser light 6 is in a blue-violet range near the wavelength of 405 nm.

Unlike Embodiment 1, information recording medium 200 according to Embodiment 2 is a medium having information layers only on one side.

Information recording medium 200 includes first information layer 10, second information layer 20, and third information layer 30 that are sequentially stacked on substrate 1 via intermediate separation layers 2 and 3, for example, and further includes cover layer 4 in contact with third information layer 30. Second information layer 20 and third information layer 30 are light-transmissive information layers.

With information recording medium 200, when substrate 1 has the guide grooves, the capacity per information layer can be 33.4 GB in conformity with the BD-XL standard, for example, by forming pits at positions, in a recording film, that correspond to the grooves, that is, by performing groove recording. Since information recording medium 200 can record and reproduce information with three information layers, it is possible to obtain an information recording medium having a capacity of 100 GB according to the present embodiment.

The effective reflectances of the three information layers can be controlled by adjusting each of the reflectances of first, second and third information layers 10, 20, and 30, and the transmittances of second and third information layers 20 and 30.

The present embodiment describes, as an example, a configuration designed in a manner that the effective Rg of first information layer 10 is 3.3%, the effective Rg of second information layer 20 is 3.3%, and the effective Rg of third information layer 30 is 3.3%.

When the transmittance of third information layer 30 is 79% and the transmittance of second information layer 20 is 75%, the above-mentioned reflectances can be achieved by designing in a manner that Rg of first information layer 10 is 9.2%, Rg of second information layer 20 is 5.3%, and Rg of third information layer 30 is 3.3%.

Next, the function, material, and thickness of substrate 1, intermediate separation layer 2, intermediate separation layer 3, and cover layer 4 will be described.

Substrate 1 is a disc-shaped transparent substrate. As a material of substrate 1, the same material as that of substrate 1 in Embodiment 1 can be used. Although the thickness of the substrate is about 1.1 mm and the distance between grooves is about 0.32 μm in the present embodiment, the thickness of the substrate and the distance between grooves are not limited to these.

Intermediate separation layers 2 and 3 can be formed using the same material as that of intermediate separation layers 2 and 3 in Embodiment 1, and can be designed to have the same thicknesses as those of intermediate separation layers 2 and 3 in Embodiment 1.

In the present embodiment too, intermediate separation layers 2 and 3 may be provided with the guide grooves. Although the distance between the grooves is about 0.32 μm in the present embodiment, the present disclosure is not limited to this.

Cover layer 4 can be formed using the same material as that of cover layer 4 in Embodiment 1. In addition, cover layer 4 can also have the same thickness as that of cover layer 4 in Embodiment 1.

In the case of conforming to the BD standard, the thicknesses of intermediate separation layers 2 and 3 and cover layer 4 may be set such that the sum of thicknesses of intermediate separation layers 2 and 3 and cover layer 4 is 100 μm. For example, intermediate separation layer 2 may have a thickness of about 25 μm, intermediate separation layer 3 may have a thickness of about 18 μm, and cover layer 4 may have a thickness of about 57 μm.

First information layer 10 is formed by stacking at least first dielectric film 11, recording film 12, and second dielectric film 13 in this order on the front surface of substrate 1. First information layer 10 can be formed by the same method as that for first information layer 10 in Embodiment 1.

Second information layer 20 is formed by stacking at least first dielectric film 21, recording film 22, and second dielectric film 23 in this order on the front surface of intermediate separation layer 2. Second information layer 20 can be formed by the same method as that for second information layer 20 in Embodiment 1.

Third information layer 30 is formed by stacking at least first dielectric film 31, recording film 32, and second dielectric film 33 in this order on the front surface of intermediate separation layer 3. Third information layer 30 can be formed by the same method as that for third information layer 30 in Embodiment 1.

In the manner described above, information recording medium 200 having information layers on one side according to Embodiment 2 can be manufactured.

As presented above, embodiments have been described to exemplify the techniques according to the present disclosure. The accompanying drawings and the detailed description have been provided for this purpose.

Thus, among the structural elements included in the accompanying drawings and the detailed description, there are not only the essential structural elements necessary for problem solving but there may also be structural elements that are non-essential for problem solving, in order to exemplify the techniques according to the present disclosure. As such, these non-essential structural elements should not be deemed essential due to the mere fact that they are included in the accompanying drawings and the detailed description.

Moreover, since the embodiments above are to exemplify the techniques according to the present disclosure, various modifications, replacements, additions, omissions, or the like can be made within the scope of the claims or in a scope equivalent to the scope of the claims.

Next, the techniques according to the present disclosure will be described in detail with reference to examples.

EXAMPLES

More specific embodiments of the present disclosure will be described in further detail with reference to examples.

Example 1

In the present example, an example of information recording medium 100 illustrated in FIG. 1 will be described along with the manufacturing method thereof.

First, the configuration of A-side information recording medium 101 will be described. As substrate 1, a polycarbonate substrate (0.5 mm in thickness) provided with spiral guide grooves (17 nm in depth, 0.225 μm in track pitch (land-groove distance)) is prepared. On substrate 1, an $(In_2O_3)_{83}(SnO_2)_{17}$ (mol %) film having a thickness of 11 nm, a film including an oxide of $W_{20}Cu_{25}Zn_{20}Mn_{35}$ (atom %) having a thickness of 30 nm, and an $(In_2O_3)_{83}(SnO_2)_{17}$ (mol %) film having a thickness of 11 nm are sequentially formed by sputtering as first dielectric film 11, recording film 12, and second dielectric film 13, respectively.

Here, the composition of the recording film is expressed as $W_{20}Cu_{25}Zn_{20}Mn_{35}$—O. Hereinafter, for the other recording films too, the element ratio is expressed in the form showing the metal element ratio (atom %) only. For example, when the recording film includes an oxide of tungsten (W), copper (Cu), zinc (Zn), and manganese (M), and these four metal elements make up 100 atom %, the composition of the recording film is expressed as $W_{25}Cu_{25}Zn_{25}Mn_{25}$—O in the case where the proportion of W is 25 atom %, the proportion of Cu is 25 atom %, the proportion of Zn is 25 atom %, and the proportion of Mn is 25 atom %.

$(In_2O_3)_{83}(SnO_2)_{17}$ (mol %) is an $In_2O_3$—$SnO_2$(ITO)-based transparent conductive film that is commonly used, and is often represented as $(In_2O_3)_{90}(SnO_2)_{10}$ (wt %). In this specification, all the compositions of dielectric films including two or more oxides are expressed in mol %. Therefore, in order to facilitate comparison with these dielectric films in terms of composition, $(In_2O_3)_{90}(SnO_2)_{10}$ (wt %) is expressed as $(In_2O_3)_{83}(SnO_2)_{17}$ (mol %) in this specification.

The thicknesses of the films constituting first information layer 10 are determined such that when second information layer 20 and third information layer 30 are not provided, first information layer 10 has reflectances of Rg Z 10.0% and Rl≈10.5% in an unrecorded state. These reflectances are those when irradiated with laser light having a wavelength of 405 nm.

First dielectric film 11 and second dielectric film 13 are formed in a mixed gas atmosphere of Ar+$O_2$, using a DC power source. Recording film 12 is formed in a mixed gas atmosphere of Ar+$O_2$, using a pulsed DC power source. Subsequently, intermediate separation layer 2 provided with spiral guide grooves (17 nm in depth, 0.225 μm in track pitch (land-groove distance)) is formed on first information layer 10, and second information layer 20 is formed on intermediate separation layer 2.

Specifically, an $(In_2O_3)_{83}(SnO_2)_{17}$ (mol %) film having a thickness of 15 nm, a $W_{35}Cu_{15}Zn_{35}Mn_{15}$—O film having a thickness of 30 nm, and a film (dielectric film A) including an oxide dielectric material having at least 30 mol % $SnO_2$ are sequentially formed by sputtering as first dielectric film 21, recording film 22, and second dielectric film 23, respectively, to form second information layer 20.

The thickness of second dielectric film 23 is determined by calculation based on the matrix method. Specifically, the thickness is set such that when third information layer 30 is not provided, second information layer 20 in an unrecorded state has reflectances of Rg≈8.0% and Rl≈8.3% and a transmittance in a range from 64% to 68%. These reflectances and transmittance are those when irradiated with laser light having a wavelength of 405 nm.

First dielectric film 21 is formed in a mixed gas atmosphere of Ar+$O_2$, using a DC power source. Recording film 22 is formed in a mixed gas atmosphere of Ar+$O_2$, using a pulsed DC power source. Second dielectric film 23 is formed in an Ar atmosphere or a mixed gas atmosphere of Ar+$O_2$, using a DC power source or an RF power source.

Subsequently, intermediate separation layer 3 provided with spiral guide grooves (17 nm in depth, 0.225 μm in track pitch (land-groove distance)) is formed on second information layer 20, and third information layer 30 is formed on intermediate separation layer 3.

Specifically, an $(In_2O_3)_{83}(SnO_2)_{17}$ (mol %) film having a thickness of 15 nm, a $W_{40}Cu_5Zn_{40}Mn_{15}$—O film having a thickness of 30 nm, and a film (dielectric film A) including an oxide dielectric material having at least 30 mol % $SnO_2$ are sequentially formed by sputtering as first dielectric film 31, recording film 32, and second dielectric film 33, respectively, to form third information layer 30.

The thickness of second dielectric film 33 is determined by calculation based on the matrix method. Specifically, the thickness is set such that third information layer 30 in an unrecorded state has reflectances of Rg≈6.5% and Rl≈6.8% and a transmittance in a range from 67% to 72%. These reflectances and transmittance are those when irradiated with laser light having a wavelength of 405 nm.

First dielectric film 31 is formed in a mixed gas atmosphere of Ar+$O_2$, using a DC power source. Recording film 32 is formed in a mixed gas atmosphere of Ar+$O_2$, using a pulsed DC power source. Second dielectric film 33 is formed in an Ar atmosphere or a mixed gas atmosphere of Ar+$O_2$, using a DC power source or an RF power source.

After that, an ultraviolet-curable resin is applied to second dielectric film 33 and spin coating is performed, and then the resin is cured by ultraviolet light to form cover layer 4, so as to complete the manufacturing of A-side information recording medium 101.

Next, the configuration of B-side information recording medium 102 will be described. As substrate 1, a polycarbonate substrate (0.5 mm in thickness) provided with spiral guide grooves (17 nm in depth, 0.225 μm in track pitch (land-groove distance)) is prepared. The spiral direction of the guide grooves is opposite that of the guide grooves formed on substrate 1 of A-side information recording medium 101 described earlier. First information layer 10, intermediate separation layer 2, second information layer 20, intermediate separation layer 3, third information layer 30, and cover layer 4 are formed on substrate 1.

To form B-side information recording medium 102, films (a first dielectric film, a recording film, and a second dielectric film) included in each information layer are formed in a manner that each information layer has the same configuration (the composition and thickness of each film, and the reflectance and transmittance of each information layer, for example) as the corresponding information layer of A-side information recording medium 101. Each film is formed by the same method as that adopted for forming A-side information recording medium 101. Cover layer 4 also has the same configuration as cover layer 4 of A-side information recording medium 101, and is formed by the same method.

Intermediate separation layers 2 and 3 also have the same configurations as those of intermediate separation layers 2 and 3 of A-side information recording medium 101. However, the spiral direction of the guide grooves provided in intermediate separation layers 2 and 3 of B-side information recording medium 102 is opposite the spiral direction of the guide grooves provided in intermediate separation layers 2 and 3 of A-side information recording medium 101.

Finally, an ultraviolet-curable resin is uniformly applied to the surface of substrate 1 of A-side information recording medium 101 opposite the surface in which the guide grooves are formed, and the surface of substrate 1 of B-side information recording medium 102 opposite the surface in which the guide grooves are formed is bonded to the applied resin. Then, the resin is cured by ultraviolet light to form bonding layer 5. In the manner as described, information recording medium 100 of the present example is manufactured.

As information recording medium 100 of the present example, mediums are manufactured in which second dielectric film 23 of second information layer 20 and second dielectric film 33 of third information layer 30 in A-side information recording medium 101 and B-side information recording medium 102 include $SnO_2$, $(SnO_2)_{70}(In_2O_3)_{30}$ (mol %), $(SnO_2)_{50}(In_2O_3)_{50}$ (mol %), $(SnO_2)_{30}(In_2O_3)_{70}$ (mol %), $(SnO_2)_{70}(ZrO_2)_{30}$ (mol %), $(SnO_2)_{70}(Al_2O_3)_{30}$ (mol %), $(SnO_2)_{70}(TiO_2)_{30}$ (mol %), $(SnO_2)_{70}(Sb_2O_3)_{30}$ (mol %), $(SnO_2)_{70}(Ta_2O_5)_{30}$ (mol %), $(SnO_2)_{50}(ZrO_2)_{25}(In_2O_3)_{25}$ (mol %), or $(SnO_2)_{50}(ZrO_2)_{15}(SiO_2)_{15}(In_2O_3)_{20}$ (mol %). These mediums are given disc numbers 1-101 to 1-111.

For comparison, a medium is manufactured which is information recording medium 100 whose second dielectric film 23 and second dielectric film 33 in A-side information recording medium 101 and B-side information recording medium 102 include $(In_2O_3)_{90}(SnO_2)_{10}$ (wt %) ($=(In_2O_3)_{83}(SnO_2)_{17}$ (mol %)). This medium is given a disc number 1-001.

The recording sensitivity and the shelf characteristics of second information layer 20 and third information layer 30 in the present example (disc No. 1-101 to 1-111) and the comparative example (disc No. 1-001) are evaluated.

The wavelength of the laser light used by an evaluation device for signal evaluation is 405 nm, the numerical aperture NA of the objective lens is 0.85, and information is recorded on the grooves and the lands. The linear velocity for recording is 14.00 m/s (quadruple speed), and the linear velocity for reproduction is 7.00 m/s (double speed). Recording is performed at a density of 50 GB per information layer, with a data bit length of 79.5 nm.

Readout laser power is set to 1.4 mW for the first information layer and the second information layer, and 1.1 mW for the third information layer. Laser light which is high-frequency superposed (modulated) at the ratio of 2:1 is used as readout light. Recording using random signals (2 T to 8 T) is performed and data demodulation is performed by pattern recognition (PR) (1233321) machine learning (ML) signal processing, so as to evaluate the signal quality by i-MLSE. The recording sensitivity is evaluated as laser power at the best i-MLSE value.

The shelf characteristics are evaluated according to the amount of change in the recording sensitivity and i-MLSE before and after an acceleration test conducted on the discs under the conditions of 85 degrees Celsius, 80% RH, and 100 hours. The amount of change in the recording sensitivity is calculated as follows:

((recording sensitivity after acceleration test)−(initial recording sensitivity))/(initial recording sensitivity)×100%

The amount of change in i-MLSE is calculated as follows:

(i-MLSE after acceleration test)−(initial i-MLSE)

The evaluation result for second information layer 20 of A-side information recording medium 101 is shown in Table 1, the evaluation result for third information layer 30 of A-side information recording medium 101 is shown in Table 2, the evaluation result for second information layer 20 of B-side information recording medium 102 is shown in Table 3, and the evaluation result for third information layer 30 of B-side information recording medium 102 is shown in Table 4.

TABLE 1

| | | Initial characteristics | | Shelf characteristics | |
| | | | | Change in | |
| Disc No. | A-side Second dielectric film 23 | Trans-mittance | Recording sensitivity (groove/land) | recording sensitivity (groove/land) | Change in i-MLSE (groove/land) |
| --- | --- | --- | --- | --- | --- |
| 1-101 | $SnO_2$ | 65% | 21.5/22.0 mW | +5/+6% | −0.2/0.0% |
| 1-102 | $(SnO_2)_{70}(In_2O_3)_{30}$(mol %) | 66% | 21.0/21.5 mW | +6/+6% | −0.1/−0.1% |
| 1-103 | $(SnO_2)_{50}(In_2O_3)_{50}$(mol %) | 66% | 20.5/21.0 mW | +8/+7% | +0.1/+0.3% |
| 1-104 | $(SnO_2)_{30}(In_2O_3)_{70}$(mol %) | 65% | 20.0/20.5 mW | +8/+8% | +0.5/+0.8% |
| 1-105 | $(SnO_2)_{70}(ZrO_2)_{30}$(mol %) | 67% | 21.5/22.0 mW | +11/+11% | +1.0/+0.9% |
| 1-106 | $(SnO_2)_{70}(Al_2O_3)_{30}$(mol %) | 67% | 21.5/22.0 mW | +11/+10% | +0.8/+0.8% |
| 1-107 | $(SnO_2)_{70}(TiO_2)_{30}$(mol %) | 68% | 21.5/22.0 mW | +11/+11% | +1.0/+1.0% |
| 1-108 | $(SnO_2)_{70}(Sb_2O_3)_{30}$(mol %) | 64% | 19.0/19.5 mW | +8/+8% | +0.5/+0.7% |
| 1-109 | $(SnO_2)_{70}(Ta_2O_5)_{30}$(mol %) | 65% | 19.0/19.5 mW | +10/+10% | +0.6/+0.9% |
| 1-110 | $(SnO_2)_{50}(ZrO_2)_{25}(In_2O_3)_{25}$ (mol %) | 66% | 20.5/21.0 mW | +8/+7% | +0.2/+0.5% |
| 1-111 | $(SnO_2)_{50}(ZrO_2)_{15}(SiO_2)_{15}(In_2O_3)_{20}$(mol %) | 67% | 20.0/20.5 mW | +7/+7% | +0.3/+0.4% |
| 1-001 | $(In_2O_3)_{83}(SnO_2)_{17}$(mol %) | 64% | 20.0/20.5 mW | +18/+17% | +1.5/+1.8% |

TABLE 2

| Disc No. | A-side Second dielectric film 33 | Initial characteristics | | Shelf characteristics | |
|---|---|---|---|---|---|
| | | Trans-mittance | Recording sensitivity (groove/land) | Change in recording sensitivity (groove/land) | Change in i-MLSE (groove/land) |
| 1-101 | $SnO_2$ | 68% | 22.0/22.5 mW | +7/+6% | −0.3/−0.1% |
| 1-102 | $(SnO_2)_{70}(In_2O_3)_{30}$(mol %) | 69% | 21.5/22.0 mW | +8/+7% | 0.0/+0.2% |
| 1-103 | $(SnO_2)_{50}(In_2O_3)_{50}$(mol %) | 69% | 21.0/21.5 mW | +10/+10% | +0.3/+0.4% |
| 1-104 | $(SnO_2)_{30}(In_2O_3)_{70}$(mol %) | 68% | 20.5/21.0 mW | +12/+11% | +1.1/+1.2% |
| 1-105 | $(SnO_2)_{70}(ZrO_2)_{30}$(mol %) | 70% | 22.0/22.5 mW | +13/+13% | +1.4/+1.4% |
| 1-106 | $(SnO_2)_{70}(Al_2O_3)_{30}$(mol %) | 70% | 22.0/22.5 mW | +12/+13% | +1.2/+1.2% |
| 1-107 | $(SnO_2)_{70}(TiO_2)_{30}$(mol %) | 71% | 22.0/22.5 mW | +14/+13% | +1.4/+1.3% |
| 1-108 | $(SnO_2)_{70}(Sb_2O_3)_{30}$(mol %) | 67% | 19.5/20.0 mW | +11/+10% | +1.1/+1.0% |
| 1-109 | $(SnO_2)_{70}(Ta_2O_5)_{30}$(mol %) | 68% | 19.5/20.0 mW | +13/+13% | +0.9/+1.1% |
| 1-110 | $(SnO_2)_{50}(ZrO_2)_{25}(In_2O_3)_{25}$ (mol %) | 69% | 21.0/21.5 mW | +13/+12% | +0.5/+0.7% |
| 1-111 | $(SnO_2)_{50}(ZrO_2)_{15}(SiO_2)_{15}(In_2O_3)_{20}$(mol %) | 70% | 20.5/21.0 mW | +11/+12% | +0.4/+0.5% |
| 1-001 | $(In_2O_3)_{83}(SnO_2)_{17}$(mol %) | 67% | 20.5/21.0 mW | +23/+22% | +2.4/+2.7% |

TABLE 3

| Disc No. | B-side Second dielectric film 23 | Initial characteristics | | Shelf characteristics | |
|---|---|---|---|---|---|
| | | Trans-mittance | Recording sensitivity (groove/land) | Change in recording sensitivity (groove/land) | Change in i-MLSE (groove/land) |
| 1-101 | $SnO_2$ | 65% | 21.5/22.0 mW | +5/+6% | −0.2/0.0% |
| 1-102 | $(SnO_2)_{70}(In_2O_3)_{30}$(mol %) | 66% | 21.0/21.5 mW | +6/+6% | −0.1/−0.1% |
| 1-103 | $(SnO_2)_{50}(In_2O_3)_{50}$(mol %) | 66% | 20.5/21.0 mW | +8/+7% | +0.1/+0.3% |
| 1-104 | $(SnO_2)_{30}(In_2O_3)_{70}$(mol %) | 65% | 20.0/20.5 mW | +8/+8% | +0.5/+0.8% |
| 1-105 | $(SnO_2)_{70}(ZrO_2)_{30}$(mol %) | 67% | 21.5/22.0 mW | +11/+11% | +1.0/+0.9% |
| 1-106 | $(SnO_2)_{70}(Al_2O_3)_{30}$(mol %) | 67% | 21.5/22.0 mW | +11/+10% | +0.8/+0.8% |
| 1-107 | $(SnO_2)_{70}(TiO_2)_{30}$(mol %) | 68% | 21.5/22.0 mW | +11/+11% | +1.0/+1.0% |
| 1-108 | $(SnO_2)_{70}(Sb_2O_3)_{30}$(mol %) | 64% | 19.0/19.5 mW | +8/+8% | +0.5/+0.7% |
| 1-109 | $(SnO_2)_{70}(Ta_2O_5)_{30}$(mol %) | 65% | 19.0/19.5 mW | +10/+10% | +0.6/+0.9% |
| 1-110 | $(SnO_2)_{50}(ZrO_2)_{25}(In_2O_3)_{25}$ (mol %) | 66% | 20.5/21.0 mW | +8/+7% | +0.2/+0.5% |
| 1-111 | $(SnO_2)_{50}(ZrO_2)_{15}(SiO_2)_{15}(In_2O_3)_{20}$(mol %) | 67% | 20.0/20.5 mW | +7/+7% | +0.3/+0.4% |
| 1-001 | $(In_2O_3)_{83}(SnO_2)_{17}$(mol %) | 64% | 20.0/20.5 mW | +18/+17% | +1.5/+1.8% |

TABLE 4

| Disc No. | B-side Second dielectric film 33 | Initial characteristics | | Shelf characteristics | |
|---|---|---|---|---|---|
| | | Trans-mittance | Recording sensitivity (groove/land) | Change in recording sensitivity (groove/land) | Change in i-MLSE (groove/land) |
| 1-101 | $SnO_2$ | 68% | 22.0/22.5 mW | +7/+6% | −0.3/−0.1% |
| 1-102 | $(SnO_2)_{70}(In_2O_3)_{30}$(mol %) | 69% | 21.5/22.0 mW | +8/+7% | 0.0/+0.2% |
| 1-103 | $(SnO_2)_{50}(In_2O_3)_{50}$(mol %) | 69% | 21.0/21.5 mW | +10/+10% | +0.3/+0.4% |
| 1-104 | $(SnO_2)_{30}(In_2O_3)_{70}$(mol %) | 68% | 20.5/21.0 mW | +12/+11% | +1.1/+1.2% |
| 1-105 | $(SnO_2)_{70}(ZrO_2)_{30}$(mol %) | 70% | 22.0/22.5 mW | +13/+13% | +1.4/+1.4% |
| 1-106 | $(SnO_2)_{70}(Al_2O_3)_{30}$(mol %) | 70% | 22.0/22.5 mW | +12/+13% | +1.2/+1.2% |
| 1-107 | $(SnO_2)_{70}(TiO_2)_{30}$(mol %) | 71% | 22.0/22.5 mW | +14/+13% | +1.4/+1.3% |
| 1-108 | $(SnO_2)_{70}(Sb_2O_3)_{30}$(mol %) | 67% | 19.5/20.0 mW | +11/+10% | +1.1/+1.0% |
| 1-109 | $(SnO_2)_{70}(Ta_2O_5)_{30}$(mol %) | 68% | 19.5/20.0 mW | +13/+13% | +0.9/+1.1% |
| 1-110 | $(SnO_2)_{50}(ZrO_2)_{25}(In_2O_3)_{25}$ (mol %) | 69% | 21.0/21.5 mW | +13/+12% | +0.5/+0.7% |
| 1-111 | $(SnO_2)_{50}(ZrO_2)_{15}(SiO_2)_{15}(In_2O_3)_{20}$(mol %) | 70% | 20.5/21.0 mW | +11/+12% | +0.4/+0.5% |
| 1-001 | $(In_2O_3)_{83}(SnO_2)_{17}$(mol %) | 67% | 20.5/21.0 mW | +23/+22% | +2.4/+2.7% |

As shown in these tables, any information recording medium 100 of the present example has a small amount of change in the recording sensitivity and i-MLSE after the acceleration test and thus has favorable shelf characteristics as compared to disc No. 1-001 of the comparative example. Preferably, the amount of change in the recording sensitivity is approximately +15% at most and the amount of change in i-MLSE is approximately less than +1.5%.

Discs No. 1-101 to 104 show that the shelf characteristics tend to be favorable as the amount of $SnO_2$ increases. Furthermore, discs No. 1-105 to 107 show that the disc transmittance tends to improve as $ZrO_2$, $Al_2O_3$, or $TiO_2$ is added. In addition, discs No. 1-108 to 109 show that the recording sensitivity tends to improve as $Sb_2O_3$ or $Ta_2O_5$ is added.

Example 2

In the present example, an example of information recording medium 100 illustrated in FIG. 1 will be described along with the manufacturing method thereof.

First, the configuration of A-side information recording medium 101 will be described. The configuration and the manufacturing method of substrate 1 and first information layer 10 are the same as in Example 1.

Subsequently, intermediate separation layer 2 provided with spiral guide grooves (17 nm in depth, 0.225 μm in track pitch (land-groove distance)) is formed on first information layer 10, and second information layer 20 is formed on intermediate separation layer 2.

Specifically, an $(In_2O_3)_{83}(SnO_2)_{17}$ (mol %) film having a thickness of 15 nm, a $W_{35}Cu_{15}Zn_{35}Mn_{15}$—O film having a thickness of 30 nm, and a $(SnO_2)_{50}(In_2O_3)_{50}$ (mol %) film, that is dielectric film A, having a thickness of 15 nm are sequentially formed by sputtering as first dielectric film 21, recording film 22, and second dielectric film 23, respectively.

The thickness of each layer is determined by calculation based on the matrix method. Specifically, the thickness is set such that when third information layer 30 is not provided, second information layer 20 in an unrecorded state has reflectances of Rg≈8.0% and Rl≈8.3% and a transmittance of about 66%. These reflectances and transmittance are those when irradiated with laser light having a wavelength of 405 nm.

First dielectric film 21 is formed in a mixed gas atmosphere of Ar+$O_2$, using a DC power source. Recording film 22 is formed in a mixed gas atmosphere of Ar+$O_2$, using a pulsed DC power source. Second dielectric film 23 is formed in an Ar atmosphere, using a DC power source.

Subsequently, intermediate separation layer 3 provided with spiral guide grooves (17 nm in depth, 0.225 μm in track pitch (land-groove distance)) is formed on second information layer 20, and third information layer 30 is formed on intermediate separation layer 3.

Specifically, a film (dielectric film A) including an oxide dielectric material having at least 30 mol % $SnO_2$, a $W_{40}Cu_5Zn_{40}Mn_{15}$—O film having a thickness of 30 nm, and a film (dielectric film A) including an oxide dielectric material having at least 30 mol % $SnO_2$ are sequentially formed by sputtering as first dielectric film 31, recording film 32, and second dielectric film 33, respectively.

The thicknesses of first dielectric film 31 and second dielectric film 33 are determined by calculation based on the matrix method. Specifically, the thicknesses are set such that third information layer 30 in an unrecorded state has reflectances of Rg≈6.5% and Rl≈6.8% and a transmittance in a range from 67% to 72%. These reflectances are those when irradiated with laser light having a wavelength of 405 nm.

First dielectric film 31 is formed in an Ar atmosphere or a mixed gas atmosphere of Ar+$O_2$, using a DC power source or an RF power source. Recording film 32 is formed in a mixed gas atmosphere of Ar+$O_2$, using a pulsed DC power source. Second dielectric film 33 is formed in an Ar atmosphere or a mixed gas atmosphere of Ar+$O_2$, using a DC power source or an RF power source.

After that, an ultraviolet-curable resin is applied to second dielectric film 33 and spin coating is performed, and then the resin is cured by ultraviolet light to form cover layer 4, so as to manufacture A-side information recording medium 101.

Next, the configuration of B-side information recording medium 102 will be described. The configuration and the manufacturing method of substrate 1 and first information layer 10 are the same as those of substrate 1 and first information layer 10 of B-side information recording medium 102 in Example 1.

Subsequently, intermediate separation layer 2, second information layer 20, intermediate separation layer 3, third information layer 30, and cover layer 4 are formed. To form B-side information recording medium 102, films (a first dielectric film, a recording film, and a second dielectric film) included in each information layer are formed in a manner that each information layer has the same configuration (the composition and thickness of each film, and the reflectance and transmittance of each information layer, for example) as the corresponding information layer of A-side information recording medium 101. Each film is formed by the same method as that adopted for forming A-side information recording medium 101.

Cover layer 4 also has the same configuration as cover layer 4 of A-side information recording medium 101, and is formed by the same method. Intermediate separation layers 2 and 3 also have the same configurations as those of intermediate separation layers 2 and 3 of A-side information recording medium 101.

However, the spiral direction of the guide grooves provided in intermediate separation layers 2 and 3 of B-side information recording medium 102 is set opposite the spiral direction of the guide grooves provided in intermediate separation layers 2 and 3 of A-side information recording medium 101.

Finally, an ultraviolet-curable resin is uniformly applied to the surface of substrate 1 of A-side information recording medium 101 opposite the surface in which the guide grooves are formed, and the surface of substrate 1 of B-side information recording medium 102 opposite the surface in which the guide grooves are formed is bonded to the applied resin. Then, the resin is cured by ultraviolet light to form bonding layer 5. In the manner as described, information recording medium 100 of the present example is manufactured.

As information recording medium 100 of the present example, mediums are manufactured in which both first dielectric film 31 and second dielectric film 33 of third information layer 30 in A-side information recording medium 101 and B-side information recording medium 102 include $SnO_2$, $(SnO_2)_{70}(In_2O_3)_{30}$ (mol %), $(SnO_2)_{50}(In_2O_3)_{50}$ (mol %), $(SnO_2)_{30}(In_2O_3)_{70}$ (mol %), $(SnO_2)_{70}(ZrO_2)_{30}$ (mol %), $(SnO_2)_{70}(Al_2O_3)_{30}$ (mol %), $(SnO_2)_{70}(TiO_2)_{30}$ (mol %), $(SnO_2)_{70}(Sb_2O_3)_{30}$ (mol %), $(SnO_2)_{70}(Ta_2O_5)_{30}$ (mol %), $(SnO_2)_{50}(ZrO_2)_{25}(In_2O_3)_{25}$ (mol %), or $(SnO_2)_{50}(ZrO_2)_{15}(SiO_2)_{15}(In_2O_3)_{20}$ (mol %). These mediums are given disc numbers 1-112 to 1-122.

The medium (disc No. 1-001) used for comparison in Example 1 is also used for comparison in Example 2.

Signal evaluation for the information recording mediums of the present example and the comparative example is performed in the same manner as in Example 1.

The evaluation result for third information layer 30 of A-side information recording medium 101 is shown in Table 5, and the evaluation result for third information layer 30 of B-side information recording medium 102 is shown in Table 6.

TABLE 5

| Disc No. | A-side First dielectric film 31 and Second dielectric film 33 | Initial characteristics | | Shelf characteristics | |
|---|---|---|---|---|---|
| | | Trans-mittance | Recording sensitivity (groove/land) | Change in recording sensitivity (groove/land) | Change in i-MLSE (groove/land) |
| 1-112 | $SnO_2$ | 69% | 23.0/23.5 mW | +6/+5% | −0.3/−0.2% |
| 1-113 | $(SnO_2)_{70}(In_2O_3)_{30}$(mol %) | 70% | 22.5/23.0 mW | +7/+5% | −0.1/+0.2% |
| 1-114 | $(SnO_2)_{50}(In_2O_3)_{50}$(mol %) | 70% | 22.0/22.5 mW | +8/+8% | +0.3/+0.3% |
| 1-115 | $(SnO_2)_{30}(In_2O_3)_{70}$(mol %) | 69% | 21.5/22.0 mW | +9/+10% | +0.9/+1.0% |
| 1-116 | $(SnO_2)_{70}(ZrO_2)_{30}$(mol %) | 72% | 23.0/23.5 mW | +11/+12% | +1.2/+1.3% |
| 1-117 | $(SnO_2)_{70}(Al_2O_3)_{30}$(mol %) | 71% | 23.0/23.5 mW | +10/+10% | +0.9/+1.2% |
| 1-118 | $(SnO_2)_{70}(TiO_2)_{30}$(mol %) | 72% | 23.0/23.5 mW | +13/+12% | +1.2/+1.4% |
| 1-119 | $(SnO_2)_{70}(Sb_2O_3)_{30}$(mol %) | 69% | 20.5/21.0 mW | +9/+8% | +0.8/+0.7% |
| 1-120 | $(SnO_2)_{70}(Ta_2O_5)_{30}$(mol %) | 70% | 20.5/21.0 mW | +11/+10% | +0.7/+0.9% |
| 1-121 | $(SnO_2)_{50}(ZrO_2)_{25}(In_2O_3)_{25}$ (mol %) | 71% | 22.0/22.5 mW | +11/+11% | +0.3/+0.5% |
| 1-122 | $(SnO_2)_{50}(ZrO_2)_{15}(SiO_2)_{15}(In_2O_3)_{20}$(mol %) | 72% | 21.5/22.0 mW | +10/+10% | +0.2/+0.2% |
| 1-001 | $(In_2O_3)_{83}(SnO_2)_{17}$(mol %) | 67% | 20.5/21.0 mW | +23/+22% | +2.4/+2.7% |

TABLE 6

| Disc No. | B-side First dielectric film 31 and Second dielectric film 33 | Initial characteristics | | Shelf characteristics | |
|---|---|---|---|---|---|
| | | Trans-mittance | Recording sensitivity (groove/land) | Change in recording sensitivity (groove/land) | Change in i-MLSE (groove/land) |
| 1-112 | $SnO_2$ | 69% | 23.0/23.5 mW | +6/+5% | −0.3/−0.2% |
| 1-113 | $(SnO_2)_{70}(In_2O_3)_{30}$(mol %) | 70% | 22.5/23.0 mW | +7/+5% | −0.1/+0.2% |
| 1-114 | $(SnO_2)_{50}(In_2O_3)_{50}$(mol %) | 70% | 22.0/22.5 mW | +8/+8% | +0.3/+0.3% |
| 1-115 | $(SnO_2)_{30}(In_2O_3)_{70}$(mol %) | 69% | 21.5/22.0 mW | +9/+10% | +0.9/+1.0% |
| 1-116 | $(SnO_2)_{70}(ZrO_2)_{30}$(mol %) | 72% | 23.0/23.5 mW | +11/+12% | +1.2/+1.3% |
| 1-117 | $(SnO_2)_{70}(Al_2O_3)_{30}$(mol %) | 71% | 23.0/23.5 mW | +10/+10% | +0.9/+1.2% |
| 1-118 | $(SnO_2)_{70}(TiO_2)_{30}$(mol %) | 72% | 23.0/23.5 mW | +13/+12% | +1.2/+1.4% |
| 1-119 | $(SnO_2)_{70}(Sb_2O_3)_{30}$(mol %) | 69% | 20.5/21.0 mW | +9/+8% | +0.8/+0.7% |
| 1-120 | $(SnO_2)_{70}(Ta_2O_5)_{30}$(mol %) | 70% | 20.5/21.0 mW | +11/+10% | +0.7/+0.9% |
| 1-121 | $(SnO_2)_{50}(ZrO_2)_{25}(In_2O_3)_{25}$ (mol %) | 71% | 22.0/22.5 mW | +11/+11% | +0.3/+0.5% |
| 1-122 | $(SnO_2)_{50}(ZrO_2)_{15}(SiO_2)_{15}(In_2O_3)_{20}$(mol %) | 72% | 21.5/22.0 mW | +10/+10% | +0.2/+0.2% |
| 1-001 | $(In_2O_3)_{83}(SnO_2)_{17}$(mol %) | 67% | 20.5/21.0 mW | +23/+22% | +2.4/+2.7% |

As shown in these tables, any information recording medium 100 of the present example has a small amount of change in the recording sensitivity and i-MLSE after the acceleration test and thus has favorable shelf characteristics as compared to disc No. 1-001 of the comparative example.

When compared with disc No. 1-001 of the comparative example, discs No. 1-112 to 115 show that the shelf characteristics tend to be favorable as the amount of $SnO_2$ increases. Furthermore, discs No. 1-116 to 118 show that the disc transmittance tends to improve as $ZrO_2$, $Al_2O_3$, or $TiO_2$ is added. In addition, discs No. 1-119 to 120 show that the recording sensitivity tends to improve as $Sb_2O_3$ or $Ta_2O_5$ is added.

Example 3

In the present example, an example of information recording medium 100 illustrated in FIG. 1 will be described along with the manufacturing method thereof.

First, the configuration of A-side information recording medium 101 will be described. As substrate 1, a polycarbonate substrate (0.5 mm in thickness) provided with spiral guide grooves (17 nm in depth, 0.225 μm in track pitch (land-groove distance)) is prepared.

On substrate 1, an $(In_2O_3)_{83}(SnO_2)_{17}$ (mol %) film having a thickness of 11 nm, a $W_{20}Cu_{25}Zn_{20}Mn_{35}$—O film having a thickness of 30 nm, and a film (dielectric film A) including an oxide dielectric material having at least 30 mol % $SnO_2$ are sequentially formed by sputtering as first dielectric film 11, recording film 12, and second dielectric film 13, respectively.

The thickness of second dielectric film 23 is determined by calculation based on the matrix method. Specifically, the thickness is set such that when second information layer 20 and third information layer 30 are not provided, first information layer 10 in an unrecorded state has reflectances of Rg≈10.0% and Rl≈10.5%. These reflectances are those when irradiated with laser light having a wavelength of 405 nm.

First dielectric film 11 is formed in a mixed gas atmosphere of Ar+$O_2$, using a DC power source. Recording film 12 is formed in a mixed gas atmosphere of Ar+$O_2$, using a pulsed DC power source. Second dielectric film 13 is formed in an Ar atmosphere or a mixed gas atmosphere of Ar+$O_2$, using a DC power source or an RF power source.

Subsequently, intermediate separation layer 2, second information layer 20, intermediate separation layer 3, third information layer 30, and cover layer 4 are formed in this order on first information layer 10. The configuration and the manufacturing method of these layers are the same as those of these layers of A-side information recording medium 101 manufactured in Example 1.

Next, the configuration of B-side information recording medium 102 will be described. As substrate 1, a polycarbonate substrate (0.5 mm in thickness) provided with spiral guide grooves (17 nm in depth, 0.225 μm in track pitch (land-groove distance)) is prepared. The spiral direction of the guide grooves is opposite that of the guide grooves formed on substrate 1 of A-side information recording medium 101 described earlier.

On substrate 1, an $(In_2O_3)_{83}(SnO_2)_{17}$ (mol %) film having a thickness of 11 nm, a $W_{20}Cu_{25}Zn_{20}Mn_{35}$—O film having a thickness of 30 nm, and a film (dielectric film A) including an oxide dielectric material having at least 30 mol % $SnO_2$ are sequentially formed by sputtering as first dielectric film 11, recording film 12, and second dielectric film 13, respectively.

The thickness of second dielectric film 23 is determined by calculation based on the matrix method. Specifically, the thickness is set such that when second information layer 20 and third information layer 30 are not provided, first information layer 10 in an unrecorded state has reflectances of Rg≈10.0% and Rl≈10.5%. These reflectances are those when irradiated with laser light having a wavelength of 405 nm.

First dielectric film 11 is formed in a mixed gas atmosphere of Ar+$O_2$, using a DC power source. Recording film 12 is formed in a mixed gas atmosphere of Ar+$O_2$, using a pulsed DC power source. Second dielectric film 13 is formed in an Ar atmosphere or a mixed gas atmosphere of Ar+$O_2$, using a DC power source or an RF power source.

Subsequently, intermediate separation layer 2, second information layer 20, intermediate separation layer 3, third information layer 30, and cover layer 4 are formed in this order on first information layer 10. The configuration and the manufacturing method of these layers are the same as those of these layers of A-side information recording medium 101 manufactured in Example 1.

However, the spiral direction of the guide grooves provided in intermediate separation layers 2 and 3 is opposite the spiral direction of the guide grooves provided in intermediate separation layers 2 and 3 of A-side information recording medium 101.

Finally, an ultraviolet-curable resin is uniformly applied to the surface of substrate 1 of A-side information recording medium 101 opposite the surface in which the guide grooves are formed, and the surface of substrate 1 of B-side information recording medium 102 opposite the surface in which the guide grooves are formed is bonded to the applied resin. Then, the resin is cured by ultraviolet light to form bonding layer 5. In the manner as described, information recording medium 100 of the present example is manufactured.

As information recording medium 100 of the present example, mediums are manufactured in which second dielectric film 13 of first information layer 10, second dielectric film 23 of second information layer 20, and second dielectric film 33 of third information layer 30 in A-side information recording medium 101 and B-side information recording medium 102 include $(SnO_2)_{70}(In_2O_3)_{30}$ (mol %), $(SnO_2)_{50}(In_2O_3)_{50}$ (mol %), or $(SnO_2)_{30}(In_2O_3)_{70}$ (mol %). These mediums are given disc numbers 1-123 to 1-125.

The medium (disc No. 1-001) used for comparison in Example 1 is also used for comparison in Example 3.

Signal evaluation for the information recording mediums of the present example and the comparative example is performed in the same manner as in Example 1.

The evaluation result for first information layer 10 of A-side information recording medium 101 is shown in Table 7, and the evaluation result for first information layer 10 of B-side information recording medium 102 is shown in Table 8. Evaluation on second information layer 20 and third information layer 30 has shown that the evaluation result for disc No. 1-123 is equivalent to that for disc No. 1-102, the evaluation result for disc No. 1-124 is equivalent to that for disc No. 1-103, and the evaluation result for disc No. 1-125 is equivalent to that for disc No. 1-104, and that each evaluation result is favorable. Accordingly, these evaluation results are not shown in tables.

TABLE 7

| Disc No. | A-side Second dielectric film 13 | Initial characteristics Recording sensitivity (groove/land) | Shelf characteristics Change in recording sensitivity (groove/land) | Shelf characteristics Change in i-MLSE (groove/land) |
| --- | --- | --- | --- | --- |
| 1-123 | $(SnO_2)_{70}(In_2O_3)_{30}$(mol %) | 20.5/21.0 mW | +1/+1% | −0.1/−0.1% |
| 1-124 | $(SnO_2)_{50}(In_2O_3)_{50}$(mol %) | 20.0/20.5 mW | +3/+2% | −0.1/+0.0% |
| 1-125 | $(SnO_2)_{30}(In_2O_3)_{70}$(mol %) | 19.5/20.0 mW | +5/+5% | +0.2/+0.2% |
| 1-001 | $(In_2O_3)_{83}(SnO_2)_{17}$(mol %) | 19.0/19.5 mW | +7/+7% | +0.3/+0.4% |

TABLE 8

| Disc No. | B-side Second dielectric film 13 | Initial characteristics Recording sensitivity (groove/land) | Shelf characteristics Change in recording sensitivity (groove/land) | Shelf characteristics Change in i-MLSE (groove/land) |
| --- | --- | --- | --- | --- |
| 1-123 | $(SnO_2)_{70}(In_2O_3)_{30}$(mol %) | 20.5/21.0 mW | +1/+1% | −0.1/−0.1% |
| 1-124 | $(SnO_2)_{50}(In_2O_3)_{50}$(mol %) | 20.0/20.5 mW | +3/+2% | −0.1/+0.0% |
| 1-125 | $(SnO_2)_{30}(In_2O_3)_{70}$(mol %) | 19.5/20.0 mW | +5/+5% | +0.2/+0.2% |
| 1-001 | $(In_2O_3)_{83}(SnO_2)_{17}$(mol %) | 19.0/19.5 mW | +7/+7% | +0.3/+0.4% |

As shown in these tables, any information recording medium 100 of the present example has a small amount of change in the recording sensitivity and i-MLSE after the acceleration test and thus has favorable shelf characteristics as compared to disc No. 1-001 of the comparative example.

Example 4

In the present example, an example of information recording medium 200 illustrated in FIG. 2 will be described along with the manufacturing method thereof.

As substrate 1, a polycarbonate substrate (1.1 mm in thickness) provided with spiral guide grooves (20 nm in depth, 0.32 µm in track pitch (groove-groove distance)) is prepared. On substrate 1, an $(In_2O_3)_{83}(SnO_2)_{17}$ (mol %) film having a thickness of 10 nm, a $W_{20}Cu_{25}Zn_{20}Mn_{35}$—O film having a thickness of 30 nm, and an $(In_2O_3)_{83}(SnO_2)_{17}$ (mol %) film having a thickness of 15 nm are sequentially formed by sputtering as first dielectric film 11, recording film 12, and second dielectric film 13, respectively.

The thicknesses of the films constituting first information layer 10 are determined such that when second information layer 20 and third information layer 30 are not provided, first information layer 10 has a reflectance of Rg z 9.2% in an unrecorded state. This reflectance is the one when irradiated with laser light having a wavelength of 405 nm.

First dielectric film 11 and second dielectric film 13 are formed in a mixed gas atmosphere of Ar+O$_2$, using a DC power source. Recording film 12 is formed in a mixed gas atmosphere of Ar+O$_2$, using a pulsed DC power source.

Subsequently, intermediate separation layer 2 provided with spiral guide grooves (20 nm in depth, 0.32 µm in track pitch (groove-groove distance)) is formed on first information layer 10, and second information layer 20 is formed on intermediate separation layer 2.

Specifically, an $(In_2O_3)_{83}(SnO_2)_{17}$ (mol %) film having a thickness of 13 nm, a $W_{35}Cu_{15}Zn_{35}Mn_{15}$—O film having a thickness of 30 nm, and a film (dielectric film A) including an oxide dielectric material having at least 30 mol % SnO$_2$ are sequentially formed by sputtering as first dielectric film 21, recording film 22, and second dielectric film 23, respectively, to form second information layer 20.

The thickness of second dielectric film 23 is determined by calculation based on the matrix method. Specifically, in the case of the 405-nm laser light, the thickness is set such that when third information layer 30 is not provided, second information layer 20 in an unrecorded state has a reflectance of Rg z 5.3% and a transmittance in a range from 64% to 68%. These reflectance and transmittance are those when irradiated with the laser light having a wavelength of 405 nm.

First dielectric film 21 is formed in a mixed gas atmosphere of Ar+O$_2$, using a DC power source. Recording film 22 is formed in a mixed gas atmosphere of Ar+O$_2$, using a pulsed DC power source. Second dielectric film 23 is formed in an Ar atmosphere or a mixed gas atmosphere of Ar+O$_2$, using a DC power source or an RF power source.

Subsequently, intermediate separation layer 3 provided with spiral guide grooves (20 nm in depth, 0.32 µm in track pitch (groove-groove distance)) is formed on second information layer 20, and third information layer 30 is formed on intermediate separation layer 3.

Specifically, an $(In_2O_3)_{83}(SnO_2)_{17}$ (mol %) film having a thickness of 14 nm, a $W_{40}Cu_5Zn_{40}Mn_{15}$—O film having a thickness of 30 nm, and a film (dielectric film A) including an oxide dielectric material having at least 30 mol % SnO$_2$ are sequentially formed by sputtering as first dielectric film 31, recording film 32, and second dielectric film 33, respectively, to form third information layer 30.

The thickness of second dielectric film 33 is determined by calculation based on the matrix method. Specifically, the thickness is set such that third information layer 30 in an unrecorded state has a reflectance of Rg≈3.3% and a transmittance in a range from 67% to 72%. This reflectance is the one when irradiated with the laser light having a wavelength of 405 nm.

First dielectric film 31 is formed in a mixed gas atmosphere of Ar+O$_2$, using a DC power source. Recording film 32 is formed in a mixed gas atmosphere of Ar+O$_2$, using a pulsed DC power source. Second dielectric film 33 is formed in an Ar atmosphere or a mixed gas atmosphere of Ar+$O_2$, using a DC power source or an RF power source.

After that, an ultraviolet-curable resin is applied to second dielectric film 33 and spin coating is performed, and then the resin is cured by ultraviolet light to form cover layer 4, so as to complete the manufacturing of information recording medium 200 of the present example.

As information recording medium 200 of the present example, mediums are manufactured in which second dielectric film 23 and second dielectric film 33 include $SnO_2$, $(SnO_2)_{70}(In_2O_3)_{30}$ (mol %), $(SnO_2)_{50}(In_2O_3)_{50}$ (mol %), $(SnO_2)_{30}(In_2O_3)_{70}$ (mol %), $(SnO_2)_{70}(ZrO_2)_{30}$ (mol %), $(SnO_2)_{70}(Al_2O_3)_{30}$ (mol %), $(SnO_2)_{70}(TiO_2)_{30}$ (mol %), $(SnO_2)_{70}(Sb_2O_3)_{30}$ (mol %), $(SnO_2)_{7}(Ta_2O_5)_{30}$ (mol %), $(SnO_2)_{50}(ZrO_2)_{25}(In_2O_3)_{25}$ (mol %), or $(SnO_2)_{50}(ZrO_2)_{15}(SiO_2)_{15}(In_2O_3)_{20}$ (mol %). These mediums are given disc numbers 2-101 to 2-111.

For comparison, a medium is manufactured which is information recording medium 200 having second dielectric film 23 and second dielectric film 33 that include $(In_2O_3)_{90}(SnO_2)_{10}$ (wt %) (=$(In_2O_3)_{83}(SnO_2)_{17}$ (mol %)). This medium is given a disc number 2-001.

For the present example (disc No. 2-101 to 2-111) and the comparative example (disc No. 2-001), the recording sensitivity and the shelf characteristics of second information layer 20 and third information layer 30 are evaluated in conformity to the "BD-XL" standard that is one of the standards for Blu-ray (registered trademark) discs (BDs).

The wavelength of the laser light used by an evaluation device for signal evaluation is 405 nm, the numerical aperture NA of the objective lens is 0.85, and information is recorded on the grooves. The linear velocity for recording is 14.72 m/s (quadruple speed), and the linear velocity for reproduction is 7.36 m/s (double speed). Recording is performed at a density of 33.4 GB per information layer, with a shortest mark length (2 T) of 0.111 μm.

Readout laser power is set to 1.4 mW for the first and second information layers, and 1.1 mW for the third information layer. Laser light which is high-frequency superposed (modulated) at the ratio of 2:1 is used as readout light.

Data demodulation is performed by PR (1222221) ML signal processing so as to evaluate the signal quality by i-MLSE. The recording sensitivity is evaluated as laser power at the best i-MLSE value.

The shelf characteristics are evaluated according to the amount of change in the recording sensitivity and i-MLSE before and after an acceleration test conducted on discs under the conditions of 85 degrees Celsius, 85% RH, and 100 hours. The amount of change in the recording sensitivity is calculated as follows:

((recording sensitivity after acceleration test)−(initial recording sensitivity))/(initial recording sensitivity)×100%

The amount of change in i-MLSE is calculated as follows:

(i-MLSE after acceleration test)−(initial i-MLSE)

The evaluation result for second information layer 20 is shown in Table 9, and the evaluation result for third information layer 30 is shown in Table 10.

TABLE 9

| | | Initial characteristics | | Shelf characteristics | |
| | | | | Change in | |
| Disc No. | Second dielectric film 23 | Trans-mittance | Recording sensitivity (groove) | recording sensitivity (groove) | Change in i-MLSE (groove) |
| --- | --- | --- | --- | --- | --- |
| 2-101 | $SnO_2$ | 65% | 23.0 mW | +5% | 0.0% |
| 2-102 | $(SnO_2)_{70}(In_2O_3)_{30}$(mol %) | 66% | 22.5 mW | +6% | −0.1% |
| 2-103 | $(SnO_2)_{50}(In_2O_3)_{50}$(mol %) | 66% | 22.5 mW | +7% | 0.0% |
| 2-104 | $(SnO_2)_{30}(In_2O_3)_{70}$(mol %) | 65% | 21.5 mW | +9% | +0.2% |
| 2-105 | $(SnO_2)_{70}(ZrO_2)_{30}$(mol %) | 67% | 23.0 mW | +12% | +0.7% |
| 2-106 | $(SnO_2)_{70}(Al_2O_3)_{30}$(mol %) | 67% | 23.0 mW | +11% | +0.8% |
| 2-107 | $(SnO_2)_{70}(TiO_2)_{30}$(mol %) | 68% | 23.5 mW | +13% | +1.0% |
| 2-108 | $(SnO_2)_{70}(Sb_2O_3)_{30}$(mol %) | 64% | 20.5 mW | +9% | +0.4% |
| 2-109 | $(SnO_2)_{70}(Ta_2O_5)_{30}$(mol %) | 65% | 21.0 mW | +10% | +0.9% |
| 2-110 | $(SnO_2)_{50}(ZrO_2)_{25}(In_2O_3)_{25}$ (mol %) | 66% | 21.5 mW | +8% | +0.2% |
| 2-111 | $(SnO_2)_{50}(ZrO_2)_{15}(SiO_2)_{15}(In_2O_3)_{20}$(mol %) | 67% | 22.0 mW | +8% | +0.1% |
| 2-001 | $(In_2O_3)_{83}(SnO_2)_{17}$(mol %) | 64% | 21.5 mW | +16% | +1.5% |

TABLE 10

| | | Initial characteristics | | Shelf characteristics | |
| | | | | Change in | |
| Disc No. | Second dielectric film 33 | Trans-mittance | Recording sensitivity (groove) | recording sensitivity (groove) | Change in i-MLSE (groove) |
| --- | --- | --- | --- | --- | --- |
| 2-101 | $SnO_2$ | 68% | 24.0 mW | +6% | −0.1% |
| 2-102 | $(SnO_2)_{70}(In_2O_3)_{30}$(mol %) | 69% | 23.0 mW | +7% | −0.1% |
| 2-103 | $(SnO_2)_{50}(In_2O_3)_{50}$(mol %) | 69% | 22.5 mW | +8% | +0.1% |

TABLE 10-continued

| | | Initial characteristics | | Shelf characteristics | |
| | | | | Change in | |
| Disc No. | Second dielectric film 33 | Trans-mittance | Recording sensitivity (groove) | recording sensitivity (groove) | Change in i-MLSE (groove) |
| --- | --- | --- | --- | --- | --- |
| 2-104 | $(SnO_2)_{30}(In_2O_3)_{70}$(mol %) | 68% | 22.0 mW | +10% | +0.3% |
| 2-105 | $(SnO_2)_{70}(ZrO_2)_{30}$(mol %) | 70% | 23.5 mW | +12% | +0.8% |
| 2-106 | $(SnO_2)_{70}(Al_2O_3)_{30}$(mol %) | 70% | 23.5 mW | +12% | +0.7% |
| 2-107 | $(SnO_2)_{70}(TiO_2)_{30}$(mol %) | 71% | 24.0 mW | +14% | +1.2% |
| 2-108 | $(SnO_2)_{70}(Sb_2O_3)_{30}$(mol %) | 67% | 20.5 mW | +10% | +1.0% |
| 2-109 | $(SnO_2)_{70}(Ta_2O_5)_{30}$(mol %) | 68% | 21.0 mW | +13% | +0.9% |
| 2-110 | $(SnO_2)_{50}(ZrO_2)_{25}(In_2O_3)_{25}$ (mol %) | 69% | 22.5 mW | +10% | +0.5% |
| 2-111 | $(SnO_2)_{50}(ZrO_2)_{15}(SiO_2)_{15}(In_2O_3)_{20}$(mol %) | 70% | 22.5 mW | +11% | +0.4% |
| 2-001 | $(In_2O_3)_{83}(SnO_2)_{17}$(mol %) | 67% | 22.0 mW | +20% | +2.4% |

As shown in these tables, any information recording medium 200 of the present example has a small amount of change in the recording sensitivity and i-MLSE after the acceleration test and thus has favorable shelf characteristics as compared to disc No. 2-001 of the comparative example. Preferably, the amount of change in the recording sensitivity is approximately +15% at most and the amount of change in i-MLSE is approximately less than +1.5%.

Disc No. 2-101 to 104 show that the shelf characteristics tend to be favorable as the amount of $SnO_2$ increases. Furthermore, disc No. 2-105 to 107 show that the disc transmittance tends to improve as $ZrO_2$, $Al_2O_3$, or $TiO_2$ is added. In addition, disc No. 2-108 to 109 show that the recording sensitivity tends to improve as $Sb_2O_3$ or $Ta_2O_5$ is added.

Example 5

In the present example, an example of information recording medium 100 illustrated in FIG. 1 will be described along with the manufacturing method thereof.

First, the configuration of A-side information recording medium 101 will be described. The configuration and the manufacturing method of substrate 1, first information layer 10, intermediate separation layer 2, and second information layer 20 are the same as those in Example 2.

Subsequently, intermediate separation layer 3 provided with spiral guide grooves (17 nm in depth, 0.225 μm in track pitch (land-groove distance)) is formed on second information layer 20, and third information layer 30 is formed on intermediate separation layer 3.

Specifically, an $(In_2O_3)_{83}(SnO_2)_{17}$ (mol %) film having a thickness of 15 nm, a film having the composition shown in Table 11 and a thickness of 30 nm, and a $(SnO_2)_{50}(In_2O_3)_{50}$ (mol %) film (dielectric film A) having a thickness of 15 nm are sequentially formed by sputtering as first dielectric film 31, recording film 32, and second dielectric film 33, respectively, to form third information layer 30.

The thicknesses of first dielectric film 31 and second dielectric film 33 are determined by calculation based on the matrix method. Specifically, these thicknesses are set such that third information layer 30 in an unrecorded state has reflectances of Rg≈6.5% and Rl≈6.8% and a transmittance in a range from 67% to 72%. These reflectances and transmittance are those when irradiated with the laser light having a wavelength of 405 nm.

First dielectric film 31 is formed in a mixed gas atmosphere of Ar+$O_2$, using a DC power source. Recording film 32 is formed in a mixed gas atmosphere of Ar+$O_2$, using a pulsed DC power source. Second dielectric film 33 is formed in a mixed gas atmosphere of Ar+$O_2$, using a DC power source.

After that, an ultraviolet-curable resin is applied to second dielectric film 33 and spin coating is performed, and then the resin is cured by ultraviolet light to form cover layer 4, so as to manufacture A-side information recording medium 101.

Next, the configuration of B-side information recording medium 102 will be described. The configuration and the manufacturing method of substrate 1, first information layer 10, intermediate separation layer 2, and second information layer 20 are the same as those in Example 2.

Subsequently, intermediate separation layer 3 provided with spiral guide grooves (17 nm in depth, 0.225 μm in track pitch (land-groove distance)) is formed on second information layer 20. The spiral direction of the guide grooves is opposite the spiral direction of the guide grooves of intermediate separation layer 3 of A-side information recording medium 101 described earlier.

Third information layer 30 is formed on intermediate separation layer 3. Specifically, an $(In_2O_3)_{83}(SnO_2)_{17}$ (mol %) film having a thickness of 15 nm, a film having the composition shown in Table 12 and a thickness of 30 nm, and a $(SnO_2)_{50}(In_2O_3)_{50}$ (mol %) film (dielectric film A) having a thickness of 15 nm are sequentially formed by sputtering as first dielectric film 31, recording film 32, and second dielectric film 33, respectively, to form third information layer 30.

The thicknesses of first dielectric film 31 and second dielectric film 33 are determined by calculation based on the matrix method. Specifically, these thicknesses are set such that third information layer 30 in an unrecorded state has reflectances of Rg≈6.5% and Rl≈6.8% and a transmittance in a range from 67% to 72%. These reflectances are those when irradiated with the laser light having a wavelength of 405 nm.

First dielectric film 31 is formed in a mixed gas atmosphere of Ar+O2, using a DC power source. Recording film 32 is formed in a mixed gas atmosphere of Ar+$O_2$, using a pulsed DC power source. Second dielectric film 33 is formed in a mixed gas atmosphere of Ar+$O_2$, using a DC power source.

After that, an ultraviolet-curable resin is applied to second dielectric film 33 and spin coating is performed, and then the resin is cured by ultraviolet light to form cover layer 4, so as to manufacture B-side information recording medium 102.

Finally, an ultraviolet-curable resin is uniformly applied to the surface of substrate 1 of A-side information recording medium 101 opposite the surface in which the guide grooves are formed, and the surface of substrate 1 of B-side information recording medium 102 opposite the surface in which the guide grooves are formed is bonded to the applied resin. Then, the resin is cured by ultraviolet light to form bonding layer 5. In the manner as described, information recording medium 100 of the present example is manufactured.

As information recording medium 100 of the present example, mediums are manufactured in which recording film 32 of third information layer 30 in A-side information recording medium 101 and B-side information recording medium 102 includes $W_{40}Zn_{40}Mn_{20}$—O, $W_{40}Zn_{40}Pd_{20}$—O, $W_{40}Cu_5Zn_{40}Pd_{15}$—O, $W_{40}Cu_5Zn_{40}Au_{15}$—O, $W_{40}Cu_5Zn_{40}Ni_{15}$—O, $W_{40}Cu_5Zn_{40}Co_{15}$—O, $W_{40}Cu_5Zn_{40}Fe_{15}$—O, $W_{40}Cu_5Zn_{40}Mn_{10}Al_5$—O, $W_{40}Cu_5Zn_{40}Mn_{10}Ag_5$—O, or $W_{40}Cu_5Zn_{40}Mn_{10}Bi_5$—O. These mediums are given disc numbers 1-126 to 1-135.

The shelf characteristics of the information recording mediums of disc No. 1-126 to 1-135 are evaluated in the same manner as in Example 1. In addition, the modulation depth of random signals at the initial recording sensitivity is also evaluated. The evaluation result for third information layer 30 of A-side information recording medium 101 is shown in Table 11, and the evaluation result for third information layer 30 of B-side information recording medium 102 is shown in Table 12.

TABLE 11

| Disc No. | A-side Recording film 32 | Initial characteristics Modulation depth (groove/land) | Shelf characteristics Change in recording sensitivity (groove/land) | Change in i-MLSE (groove/land) |
|---|---|---|---|---|
| 1-126 | $W_{40}Zn_{40}Mn_{20}$—O | 54/50% | +5/+6% | +0.2/+0.3% |
| 1-127 | $W_{40}Zn_{40}Pd_{20}$—O | 52/47% | +5/+4% | 0.0/+0.2% |
| 1-128 | $W_{40}Cu_5Zn_{40}Pd_{15}$—O | 56/51% | +5/+5% | +0.1/+0.1% |
| 1-129 | $W_{40}Cu_5Zn_{40}Au_{15}$—O | 53/49% | +8/+7% | +0.5/+0.7% |
| 1-130 | $W_{40}Cu_5Zn_{40}Ni_{15}$—O | 50/45% | +9/+9% | +0.8/+0.8% |
| 1-131 | $W_{40}Cu_5Zn_{40}Co_{15}$—O | 50/45% | +12/+10% | +0.9/+1.3% |
| 1-132 | $W_{40}Cu_5Zn_{40}Fe_{15}$—O | 48/43% | +13/+11% | +1.1/+1.3% |
| 1-133 | $W_{40}Cu_5Zn_{40}Mn_{10}Al_5$—O | 50/46% | +8/+9% | +0.6/+0.9% |
| 1-134 | $W_{40}Cu_5Zn_{40}Mn_{10}Ag_5$—O | 52/48% | +5/+5% | +0.5/+0.5% |
| 1-135 | $W_{40}Cu_5Zn_{40}Mn_{10}Bi_5$—O | 47/42% | +13/+13% | +1.2/+1.2% |

TABLE 12

| Disc No. | B-side Recording film 32 | Initial characteristics Modulation depth (groove/land) | Shelf characteristics Change in recording sensitivity (groove/land) | Change in i-MLSE (groove/land) |
|---|---|---|---|---|
| 1-126 | $W_{40}Zn_{40}Mn_{20}$—O | 54/50% | +5/+6% | +0.2/+0.3% |
| 1-127 | $W_{40}Zn_{40}Pd_{20}$—O | 52/47% | +5/+4% | 0.0/+0.2% |
| 1-128 | $W_{40}Cu_5Zn_{40}Pd_{15}$—O | 56/51% | +5/+5% | +0.1/+0.1% |
| 1-129 | $W_{40}Cu_5Zn_{40}Au_{15}$—O | 53/49% | +8/+7% | +0.5/+0.7% |
| 1-130 | $W_{40}Cu_5Zn_{40}Ni_{15}$—O | 50/45% | +9/+9% | +0.8/+0.8% |
| 1-131 | $W_{40}Cu_5Zn_{40}Co_{15}$—O | 50/45% | +12/+10% | +0.9/+1.3% |
| 1-132 | $W_{40}Cu_5Zn_{40}Fe_{15}$—O | 48/43% | +13/+11% | +1.1/+1.3% |
| 1-133 | $W_{40}Cu_5Zn_{40}Mn_{10}Al_5$—O | 50/46% | +8/+9% | +0.6/+0.9% |
| 1-134 | $W_{40}Cu_5Zn_{40}Mn_{10}Ag_5$—O | 52/48% | +5/+5% | +0.5/+0.5% |
| 1-135 | $W_{40}Cu_5Zn_{40}Mn_{10}Bi_5$—O | 47/42% | +13/+13% | +1.2/+1.2% |

As shown in these tables, any information recording medium 100 of the present example is favorable as having an initial modulation depth of at least 40%, and also has favorable shelf characteristics. As described above, an information recording medium having favorable shelf characteristics can be obtained by using a dielectric film (dielectric film A) including at least 30 mol % tin oxide, for an information layer including a recording film that includes tungsten and oxygen.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

Since the information recording medium and the manufacturing method thereof according to the present disclosure exhibit favorable recording and reproducing properties and high reliability even after the information recording medium is stored for a long period of time, they are useful for multilayered write-once-read-many optical discs that record and store a large amount of content. Specifically, they are useful for, for instance, optical discs (100-GB capacity) having three information layers on one side in conformity to the BD-XL standard and next-generation optical discs (300- or 500-GB capacity, for example) having three information layers on both sides.

What is claimed is:

1. An information recording medium which is of a write-once-read-many type and records or reproduces information when irradiated with laser light, the information recording medium comprising:
    a substrate;
    a plurality of information layers at least one information layer of which includes a recording film that is a W—O-based recording film comprising at least tungsten (W) and oxygen (O); and
    a dielectric film A in contact with the W—O-based recording film, the dielectric film A comprising at least 30 mol % tin oxide,
    wherein the at least one information layer includes the dielectric film A, the W—O-based recording film, and an $In_2O_3$—$SnO_2$ dielectric film in stated order from a side closer to a surface of the information recording medium irradiated with the laser light, the $In_2O_3$—$SnO_2$ dielectric film comprising less than 30 mol % $SnO_2$.

2. The information recording medium according to claim 1, wherein
    the tin oxide is $SnO_2$.

3. The information recording medium according to claim 1, wherein
    the dielectric film A further comprises an oxide of an element M0, where M0 is at least one element selected from among Si, Ge, Al, Ga, In, Zn, Sb, Bi, Cr, V, Nb, Ta, Ti, Zr, Hf, and Y.

4. The information recording medium according to claim 1, wherein
    the W—O-based recording film further comprises an element M1, where M1 is at least one element selected from among Ge, Al, Zn, Bi, Te, Cu, Ag, Au, Ni, Pd, Pt, Co, Fe, Mn, Ta, Cr, and Mo.

5. The information recording medium according to claim 1, wherein
    when the plurality of information layers comprise N information layers including: an Nth information layer closest to a surface of the information recording medium irradiated with the laser light; and a first information layer closest to the substrate, at least the Nth information layer includes the W—O-based recording film and the dielectric film A, where N is a positive integer.

6. The information recording medium according to claim 1,
    wherein the information recording medium includes at least one of the plurality of information layers on both sides via the substrate.

7. The information recording medium according to claim 1, wherein
    when the information recording medium includes a guide groove in each of the plurality of information layers; and grooves of the guide groove are closer than lands of the guide groove that are between the grooves to a surface of the information recording medium irradiated with the laser light, information is recorded at positions, in each of recording films included in the plurality of information layers, that correspond to the grooves and the lands.

8. A method for manufacturing an information recording medium, the method comprising
    two or more steps of forming an information layer, wherein
    at least one of the two or more steps of forming the information layer includes:
    (i) forming a W—O-based recording film comprising tungsten (W) and oxygen (O); and
    (ii) forming a dielectric film A comprising at least 30 mol % tin oxide,
    the forming of the W—O-based recording film (i) includes sputtering, using a target comprising W and O, and
    the forming of the dielectric film A (ii) includes sputtering, using a target comprising Sn and O.

9. The method according to claim 8, wherein
    a direct current (DC) reactive sputtering method with oxygen added is used in the forming of the W—O-based recording film (i).

10. The method according to claim 8, wherein
    a direct current (DC) sputtering method is used in the forming of the dielectric film A (ii).

* * * * *